United States Patent [19]

Patterson et al.

[11] Patent Number: 5,620,383

[45] Date of Patent: Apr. 15, 1997

[54] BICYCLE DERAILLEUR AND ACTUATING SYSTEM

[75] Inventors: Sam H. Patterson; John D. Cheever; Michael W. Larson, all of Chicago, Ill.

[73] Assignee: SRAM Corporation, Chicago, Ill.

[21] Appl. No.: 520,400

[22] Filed: Aug. 29, 1995

Related U.S. Application Data

[63] Continuation-in-part of Ser. No. 384,013, Feb. 6, 1995, Pat. No. 5,533,937.

[51] Int. Cl.$^6$ .................................................. F16H 9/00
[52] U.S. Cl. .................................................. 474/80
[58] Field of Search ................... 474/69, 70, 77–82; 74/594.2

[56] References Cited

U.S. PATENT DOCUMENTS

| | | | |
|---|---|---|---|
| 4,842,568 | 6/1989 | Marchigiano | 474/80 |
| 5,102,372 | 4/1992 | Patterson et al. | 474/80 |
| 5,134,897 | 8/1992 | Romano | 74/489 |
| 5,197,927 | 3/1993 | Patterson | 474/80 |
| 5,380,253 | 1/1995 | Iwasaki | 474/80 |
| 5,421,786 | 6/1995 | Ando | 474/80 |
| 5,524,501 | 6/1996 | Patterson et al. | 74/475 |
| 5,533,937 | 7/1996 | Patterson et al. | 474/80 |

OTHER PUBLICATIONS

Exhibits I–X, photographs of Sun Tour S–1 rear derailleur, known to exist since at least 1991, public use and sale.
Exhibit XI, photograph of Sun Tour VX rear derailleur, known to exist since at least 1985, public use and sale.
Exhibit XII, photograph of Campagnolo rear derailleur, known to exist since at least 1989, public use and sale.

*Primary Examiner*—Roger J. Schoeppel
*Attorney, Agent, or Firm*—Ralph C. Francis

[57] ABSTRACT

A bicycle derailleur gear shifting system having a rotatable handgrip actuator coupled with a derailleur shifting mechanism through a control cable system so as to control the derailleur. The derailleur (50) includes an arcuate cable entraining surface (78) which substantially reduces the variation and magnitude of the actuation ratio between control cable linear displacement and movement of the derailleur p-knuckle (88). A b-knuckle flange (160) militates against the derailment of the drive chain from the upper guide wheel while permitting maximum lateral flexing of the drive chain (48) during shifting between sprockets (46) on the freewheel. A rigid arcuate surface (174) may be provided as an extension of the b-knuckle (170) in replacement of a segment of a Bowden cable housing (38) to obviate the accumulation of water and foreign matter.

33 Claims, 32 Drawing Sheets

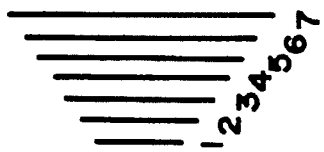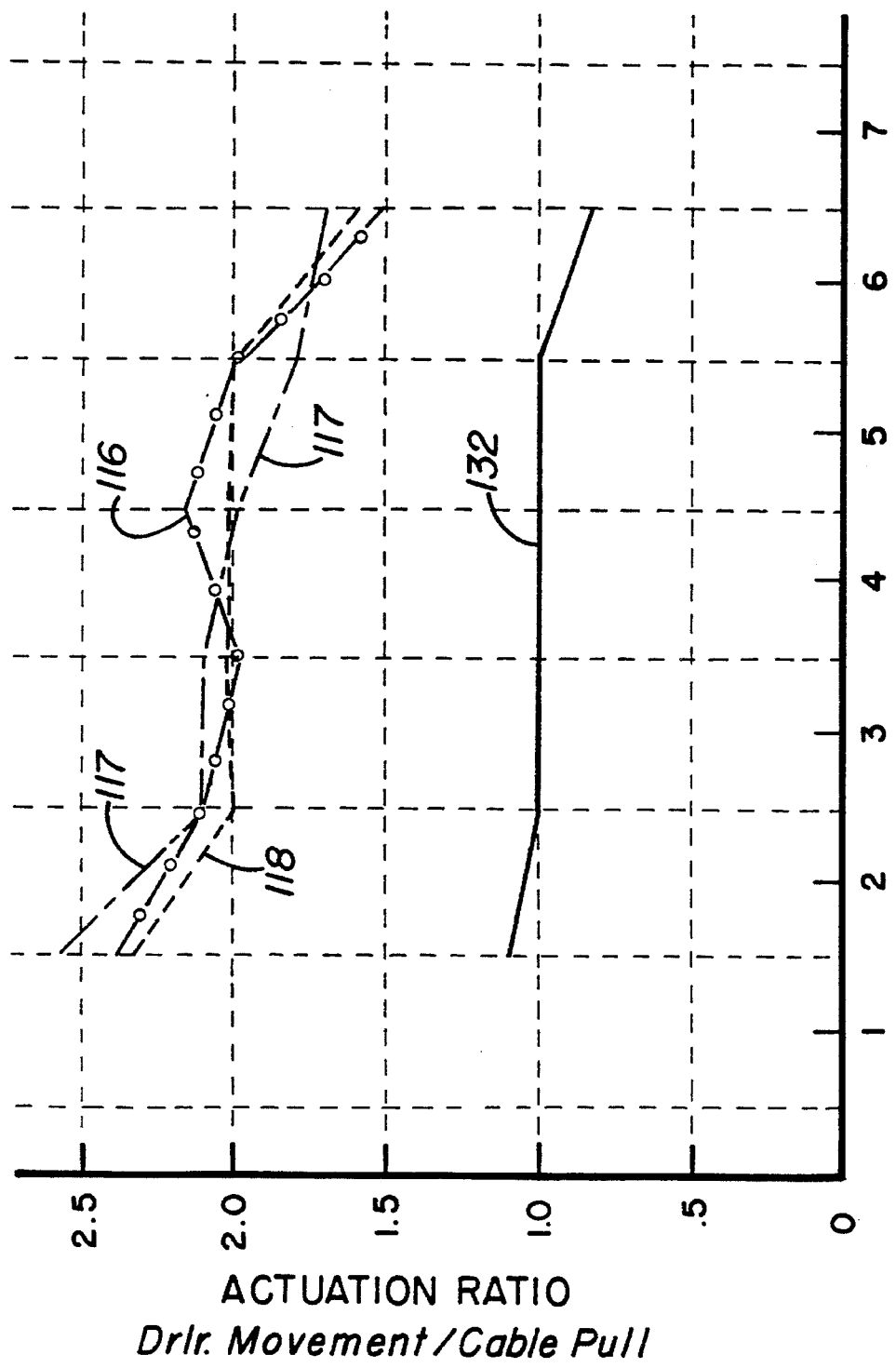
FIG. 10c

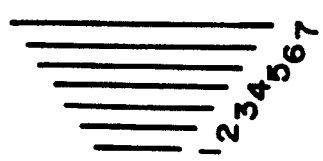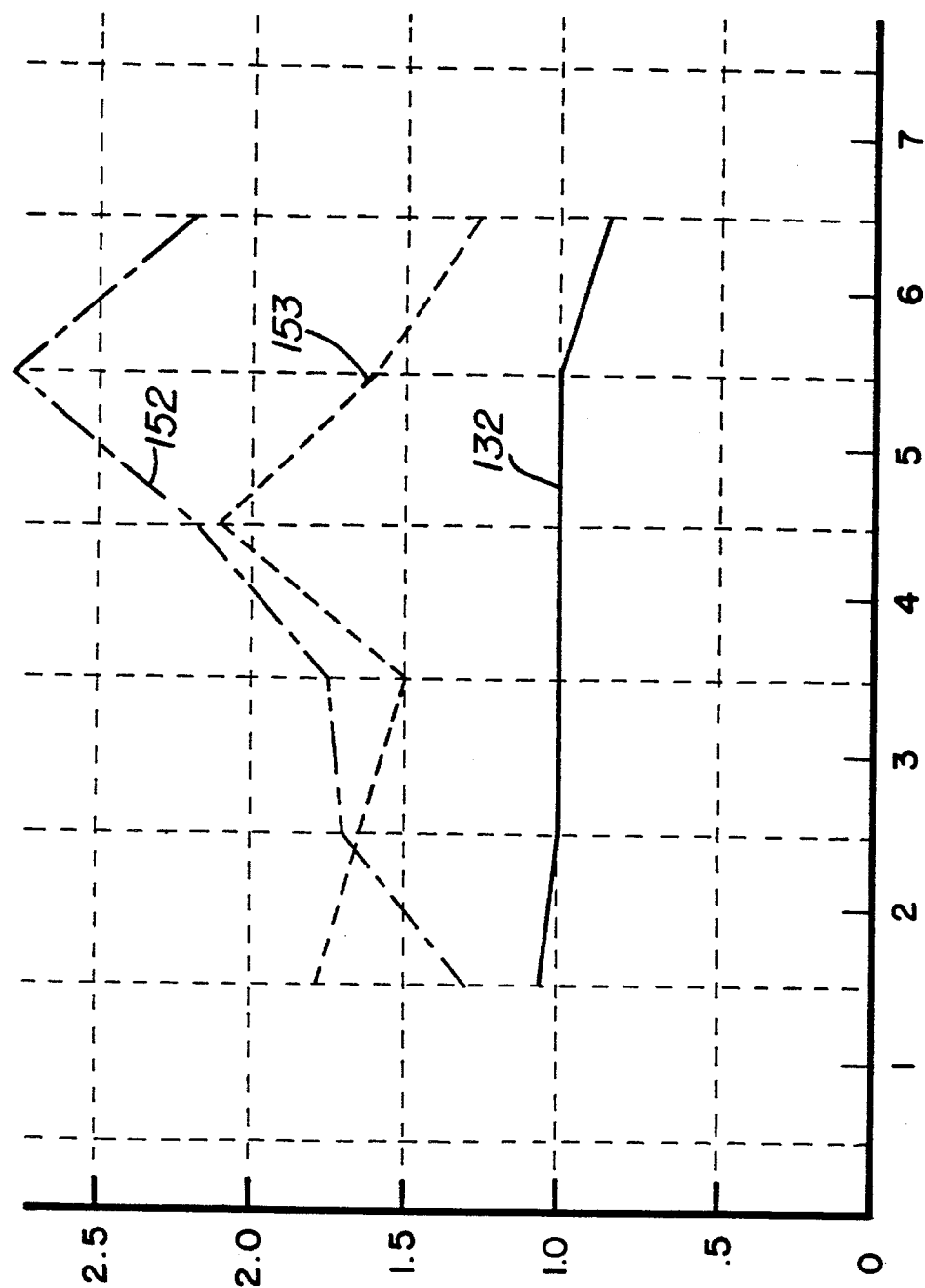
FIG. 10d

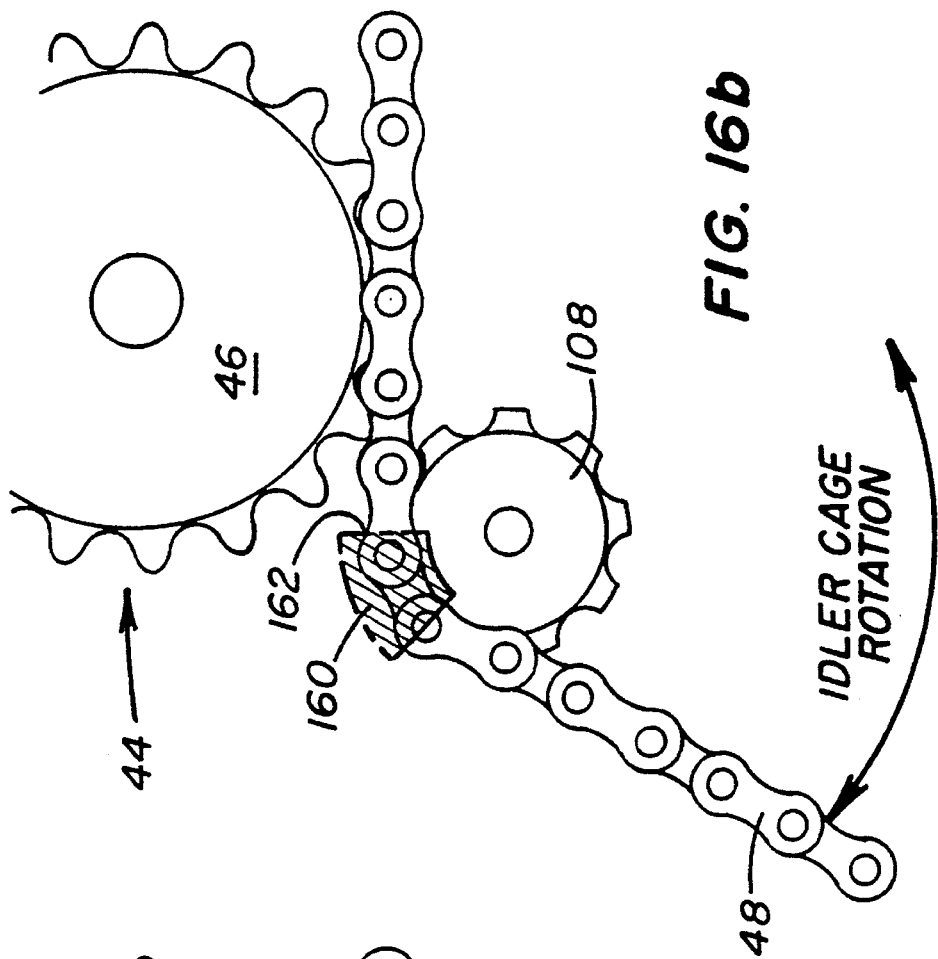
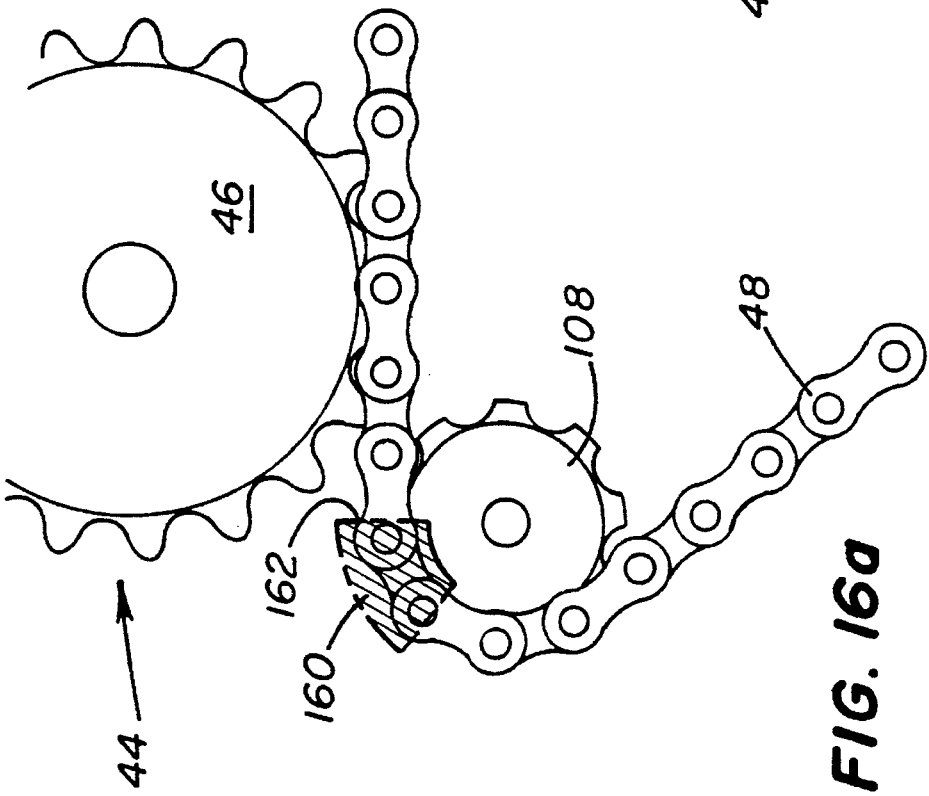

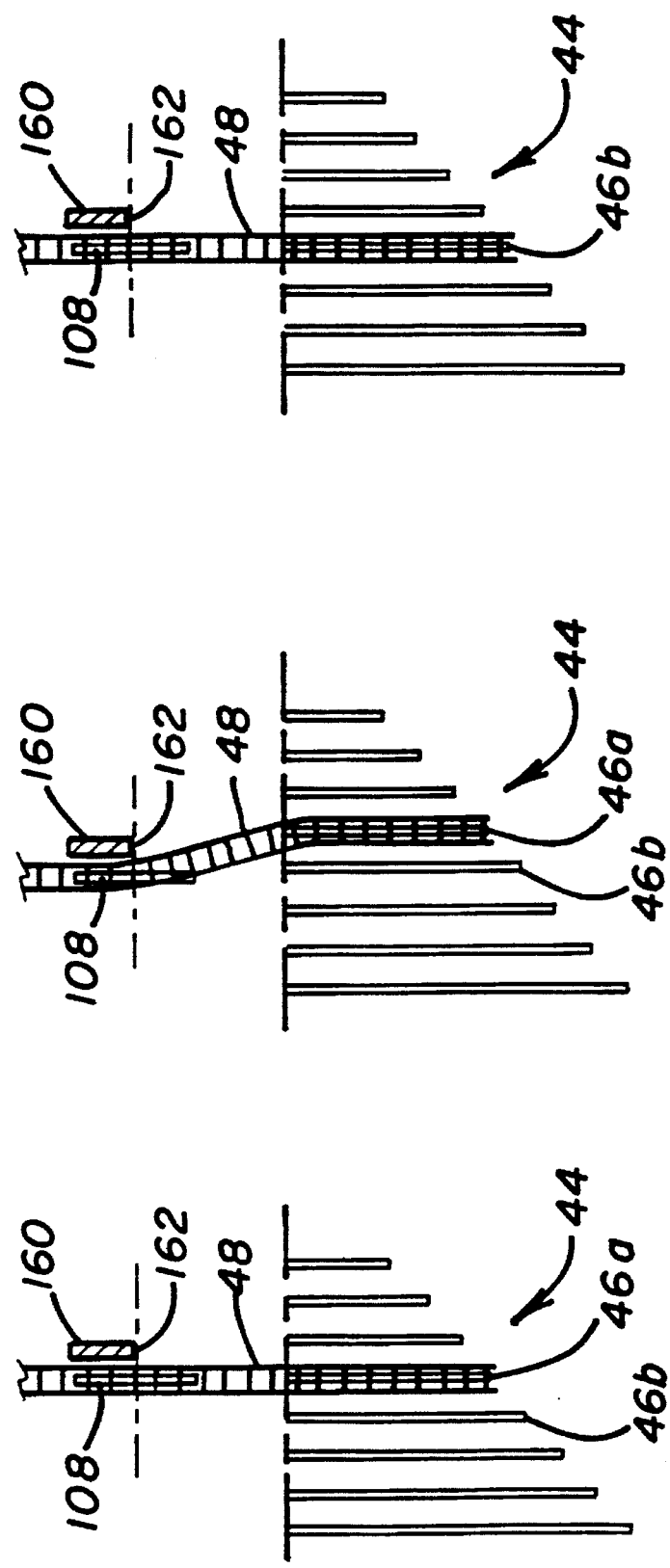

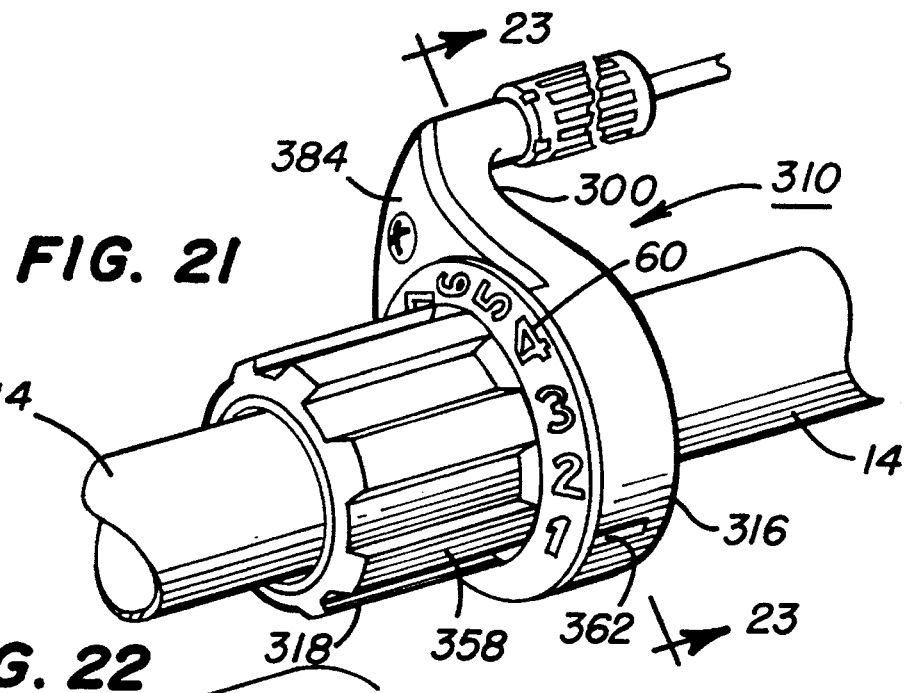
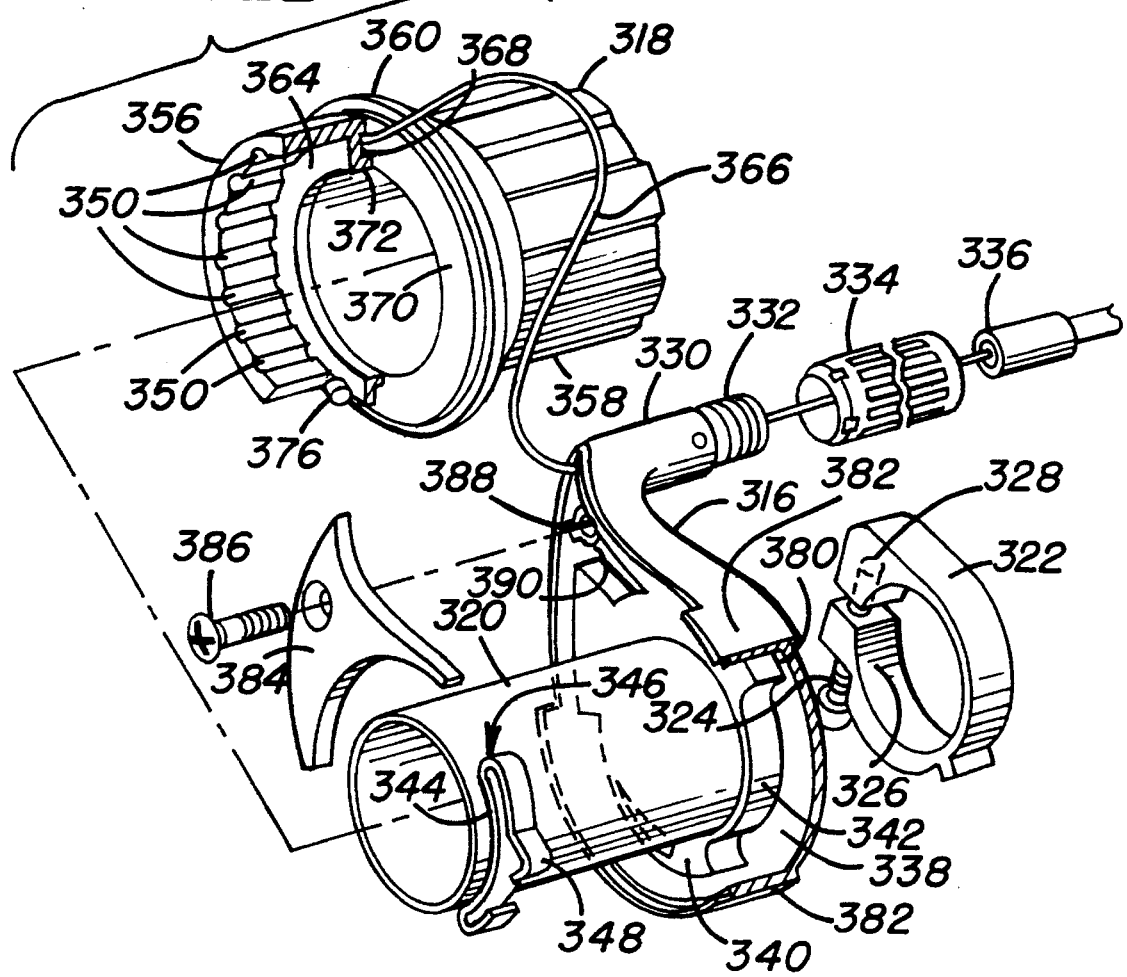

BICYCLE DERAILLEUR AND ACTUATING SYSTEM

RELAXED APPLICATION

This Application is a CONTINUATION-IN-PART of the U.S. Ser. No. 08/384,013, filed Feb. 6, 1995 now U.S. Pat. No. 5,533,937.

TECHNICAL FIELD OF THE INVENTION

The present invention relates in general to derailleur type bicycle shifting systems and more particularly to such a system wherein the rear derailleur exhibits a low actuation ratio.

BACKGROUND OF THE INVENTION

A conventional road bicycle ("road bike") is generally equipped with two chainrings on the crank and a freewheel containing five to eight gears or sprockets. A road bike freewheel includes sprockets which, in some instances, are only one gear tooth apart from each other, producing a relatively narrow range of gear ratios. A road bike is, in general, configured to be ridden at relatively high speeds on smooth surfaces.

Road bikes are, in many instances, equipped with shifting levers having relatively small take-up spool diameters that produce a relatively small control cable displacement per angular displacement of the spool. This relatively small cable displacement is used to laterally shift a rear derailleur from one sprocket to the next. Road bicycle derailleurs thus have a relatively high actuation ratio, generally defined as the amount of derailleur movement perpendicular to the planes of the freewheel sprockets per unit displacement of the derailleur control cable.

More recently, mountain bicycles ("mountain bikes") have been developed which are ridden on trails that are not at all smooth; the "technical" portions of these trails commonly include sharp inclines, large boulders and tree trunks. The mountain bike freewheel thus includes a sprocket set that has a wide range of gear ratios. Further, mountain bikes are commonly exposed to very dirty and muddy conditions, necessitating improvements in keeping the mechanical components, particularly the derailleur system, of the mountain bicycle from becoming contaminated.

As illustrated in FIG. 1, the conventional rear derailleur takes a parallelogram form, defined by points (i.e., pivots) A, B, C and D. A b-knuckle 200 (also referred to as a b-pivot), is affixed to the bicycle frame 202 (see FIG. 2) by conventional means, such as a bolt 204 and a derailleur hanger portion 206 of the bicycle frame 202. Inboard and outboard sideplates 208, 210 hingedly connect this b-knuckle 200 to a p-knuckle or p-pivot 212, which in turn has rotatably affixed to it an idler cage 214 containing two guide wheels 216, 218 for guiding the drive chain 220 onto the selected sprocket of the freewheel 222.

As illustrated in FIG. 2, the conventional derailleur system is generally actuated by a cable system 226. The cable system 226 includes a derailleur control cable 228 which is commonly a Bowden type—that is, the cable 228 is contained within a sheath 230 that terminates in a ferrule 232 affixed to the b-knuckle 200. The cable 228 continues to a clamping screw 234 or the like that clamps the cable end to one of the sideplates 208, 210, such as the outboard sideplate 210. As the cable 228 exits the ferrule 232, the cable 228 is directed in a first direction. The cable 228 is also commonly clamped to the sideplate 210 in a second direction, and this can often be quite different from the first direction depending on how far inboard or outboard the p-knuckle 212 has been pulled by the cable 228.

In many conventional derailleur systems, the cable 228 makes a sharp angle to the ferrule 232 when the p-knuckle 212 is in an outboardmost position. This produces excessive friction and, hence, wear on the cable 228 at the points where the cable 228 rubs against the ferrule 232. In addition to the excessive wear, the shift in position of the p-knuckle 212 causes the actuation ratio to change as a function of the sprocket to which the upper guide wheel 216 of the idler cage 214 is aligned.

Mountain bike designs have, of recent, employed a hand-rotatable shift actuator coaxial to, and bearing directly upon, the handlebar to displace the derailleur control cable. Illustrative is the hand-rotatable shift actuator disclosed in U.S. Pat. No. 5,134,897.

The amount of displacement of the control cable ("cable pull") in the noted patent is dramatically increased in comparison to conventional shift levers mounted on the frame by virtue of the relatively large radius of the handlebar. Certain hand-rotatable shift actuator manufacturers have attempted to minimize the cable pull by reducing the cable spooling radius (i.e., radius of handlebar plus spool thickness) and eliminating a protective sleeve or mandrel, such as that disclosed in U.S. Pat. No. 5,134,897. This is an unsatisfactory solution given the increased wear and, hence, reduced structural integrity of the handlebar.

In order to reduce the actuation ratio, the noted manufacturers have also lengthened the cable clamp to pivot distance in the derailleur. However, due to the inherent limitations of conventional derailleur designs, this modification does not achieve sufficient reduction in the actuation ratio to employ a protective sleeve or mandrel on the handlebar while maintaining optimum performance characteristics (e.g., sufficient mechanical advantage over the derailleur, sufficient degrees of rotation per shift). A need therefore exists among bicycle manufacturers for a shifting system comprising (i) a rear derailleur having a substantially uniform and low actuation ratio and (ii) a shift actuator having a simple spool and protective mandrel coaxially mounted on a handlebar.

Conventional derailleurs have an additional drawback in that the idler cage (which is used to keep the chain properly engaged to the guide wheels) is used to push the drive chain inboard onto the larger sprockets of the freewheel. Since the angular position of the idler cage in conventional derailleur systems changes according to which sprocket the guide wheel is aligned with, the idler cage will often inhibit the lateral flexing of the drive chain which is necessary for easy shifting from one sprocket (i.e., gear) to another. Instead, the idler cage in the noted conventional systems laterally pushes the drive chain over to the larger sprocket. Mechanically, this displacement of the drive chain by the idler cage by brute force produces a rough, abrasive shift that requires a relatively large amount of force. As will be recognized by those skilled in the art, this problem is exacerbated during rapid multiple shifting.

Some conventional derailleur manufacturers have attempted to optimize lateral flexing of the drive chain by employing various modifications (e.g., cage geometry) to the idler cage. Such modifications have been found unsatisfactory due to the idler cage rotation (resulting from shifting) which adversely alters the relationship between the idler cage and the drive chain.

As discussed above, a conventional rear derailleur control cable is generally housed within segments of a cable housing along certain portions of its length. As illustrated in FIG. 2, the cable housing segment 250 proximate the rear derailleur conventionally extends in a 180° reverse loop from the chainstay 252 to a ferrule 232 on the b-knuckle 200 of the rear derailleur. When used on mountain bikes, it has been found that this Bowden cable housing length collects water, mud, grit and the like. The foreign matter will have a tendency to collect in the Bowden cable housing, resulting in jamming or seizing of the cable and, hence, increasing the force required to actuate the derailleur. The cable will also have a tendency to rust at this point because of its exposure to water. A need therefore exists for a control cable design which obviates the collection of water and foreign matter within the cable housing.

An additional objective of a good derailleur/freewheel design is to have a relatively constant freewheel gap between the upper guide wheel and each of the sprockets, regardless of which sprocket the upper guide wheel is presently aligned with. This has been conventionally met by such expedients as displacing the upper guide wheel axis from the p-knuckle pivot and b-knuckle pivot. However, each additional degree of freedom built into the rear derailleur provides another chain resonating frequency when the bicycle goes over a series of bumps. This resonance will cause the chain to bounce, disengaging from the chainrings in extreme instances. Further, an offset of the guide wheel from the p-pivot creates problems in optimization of the chain gap; while a relatively constant chain gap can be specified for one particular front chainring, a shift to another chainring means that the chain gap is no longer optimized. These problems have created a need for a rear derailleur/freewheel design that is more conducive to the sport of mountain cycling.

SUMMARY OF THE INVENTION

In view of these and other problems in the art, it is a general object of the present invention to solve the problems associated with prior art bicycle derailleurs and shifting systems.

Another object of the invention is to provide a bicycle shifting system which embodies a rear derailleur having a substantially uniform and low actuation ratio and a shift actuator which is particularly simple in construction and economical to manufacture, yet which, in combination with the derailleur mechanism, has improved performance over most prior art derailleur shifting systems in all respects.

Another object of the invention is to provide a bicycle derailleur shifting system embodying a derailleur device having a substantially uniform actuation ratio no greater than 1.5:1 over the range of motion of b-knuckle.

Another object of the invention is to provide a bicycle derailleur shifting system which embodies a derailleur having a mean actuation ratio of 1.4–0.5:1.

Yet another object of the invention is to provide a derailleur shifting system which embodies a simple spool, hand-rotatable shift actuator that is conveniently rotatably mounted on the handlebar.

Yet another object of the invention is to provide a bicycle derailleur shifting system having a hand-rotatable shift actuator embodying a simple spool device for pulling and releasing cable in response to rotational movements of the actuator.

Yet a further object of the invention is to provide a bicycle derailleur shifting system embodying a rear derailleur having an actuator rotation to derailleur movement greater than 65° per inch.

The bicycle derailleur and shifting system of the present invention includes a shift actuator, a cable system and a derailleur. According to the invention, the derailleur includes a b-knuckle affixed to a bicycle frame, a p-knuckle operatively connected to the b-knuckle, an actuation regulator operatively connected to the p-knuckle and a derailleur control cable operatively connected to the actuation regulator. The derailleur generally has a substantially uniform actuation ratio no greater than 1.5:1 over the range of motion of the p-knuckle. In an alternative embodiment, the derailleur has a mean actuation ratio of 1.4–0.5:1.

The shift actuator of the invention preferably employs a simple spool method for facilitating cable movement. The actuator also includes a protective mandrel which is positioned on the handlebar.

According to the invention, the shift actuator and derailleur have an actuator rotation to derailleur movement greater than 65° per inch. More preferably, the actuator rotation to derailleur movement is in the range of 92°–97° per inch.

According to one aspect of the invention, the p-knuckle includes at least one guide wheel rotatably affixed thereto. The b-knuckle is affixed to the bicycle frame in relation to a cable housing end for the control cable. At least one sideplate is hinged between the b-knuckle and p-knuckle. An end of the control cable is affixed to this sideplate. A cable entrainment surface, such as a spooling arcuate surface, extends outwardly from the sideplate and curves toward the cable end. A length of the control cable that is proximate to its affixed end conforms to this arcuate surface. Therefore, the actuation ratio between the amount of movement of the p-knuckle and the amount of linear displacement of the cable is a function of the radius of the arcuate surface. The arcuate surface may be configured such that its radius is constant, or it may be configured to change as a function of the distance from the fixed end of the cable. In a preferred embodiment, the actuation ratio is substantially uniform and is kept below 1.5:1, making the derailleur of the invention ideal for use with hand-rotatable shift actuators employing cable spool mandrels.

BRIEF DESCRIPTION OF THE DRAWINGS

Further aspects of the invention and their advantages may be discerned from reading the following detailed description when taken in conjunction with the drawings in which:

FIG. 4 is an elevational view of the rear derailleur shown in FIG. 3a;

FIGS. 10a–10d are graphs of actuation ratio to sprocket position for each of a plurality of prior art derailleurs and a derailleur according to the invention;

FIGS. 16a and 16b are elevational schematic views showing the relative positions of the p-knuckle flange (shaded in phantom), the upper guide wheel and an engaged sprocket for a pair of different idler cage orientations;

FIGS. 18a, 18b and 18c illustrate steps in a derailleur shifting operation from a smaller sprocket to a larger sprocket using the p-knuckle flange of the invention;

FIG. 21 is a perspective view of a rotatable handgrip actuator in accordance with a preferred embodiment of the invention;

FIG. 22 is an exploded perspective view of the rotatable actuator shown in FIG. 21.

DETAILED DESCRIPTION OF THE INVENTION

The bicycle derailleur and shifting system of the present invention substantially reduces or eliminates the disadvantages and shortcomings associated with prior art shifting systems. According to the invention, a derailleur having a p-knuckle, a b-knuckle, and a derailleur actuation regulator, a shift actuator and a control cable are provided for positioning a chain on sprockets of a multiple-sprocket freewheel in response to displacement of a control cable. As discussed in detail herein, the derailleur preferably has a substantially uniform actuation ratio of less than or equal to 1.5:1 and a mean actuation ratio of 1.4–0.5:1 over the range of motion of the p-knuckle. By the term "actuation ratio" it is meant to mean the amount of derailleur movement perpendicular to the planes of the freewheel sprockets per unit displacement of the control cable.

Figure 1:
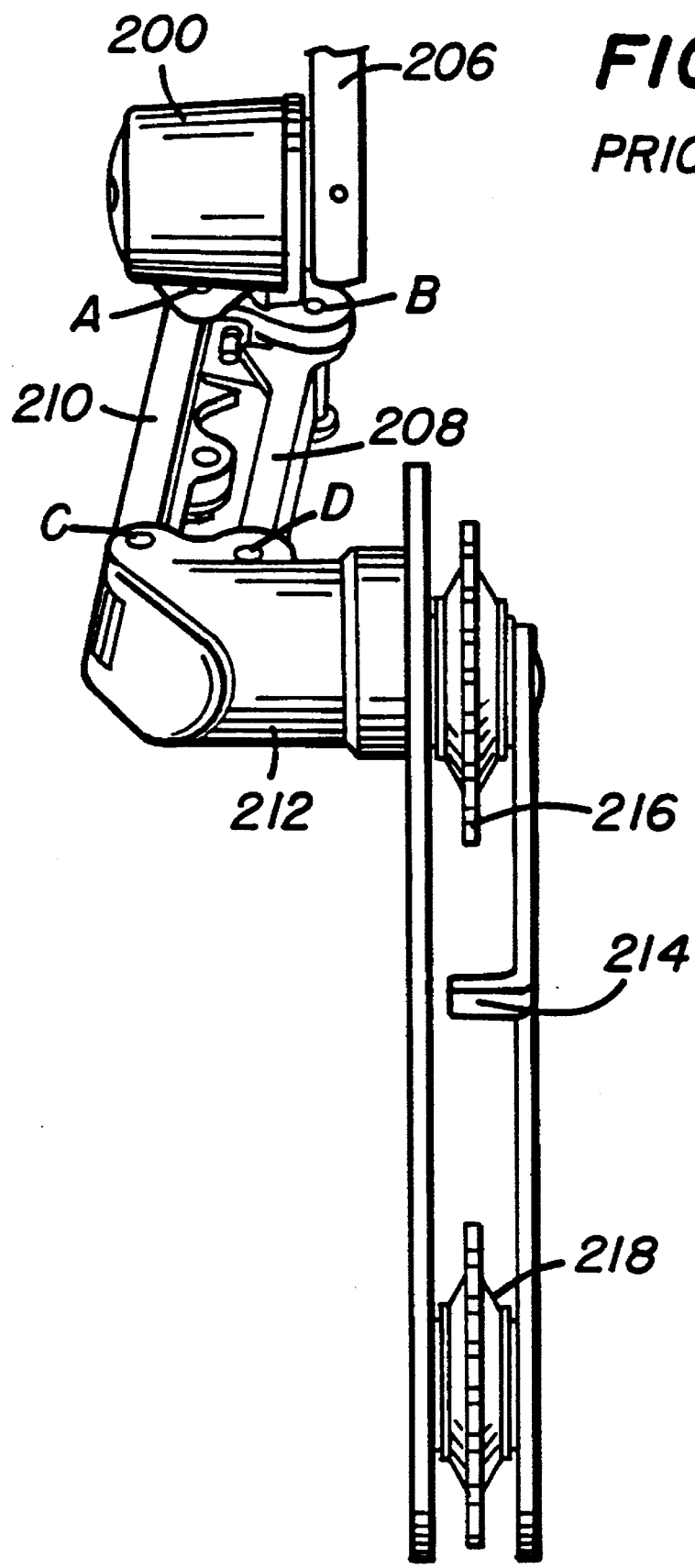
FIG. 1 is a perspective view of a prior art derailleur.
Figure 2:
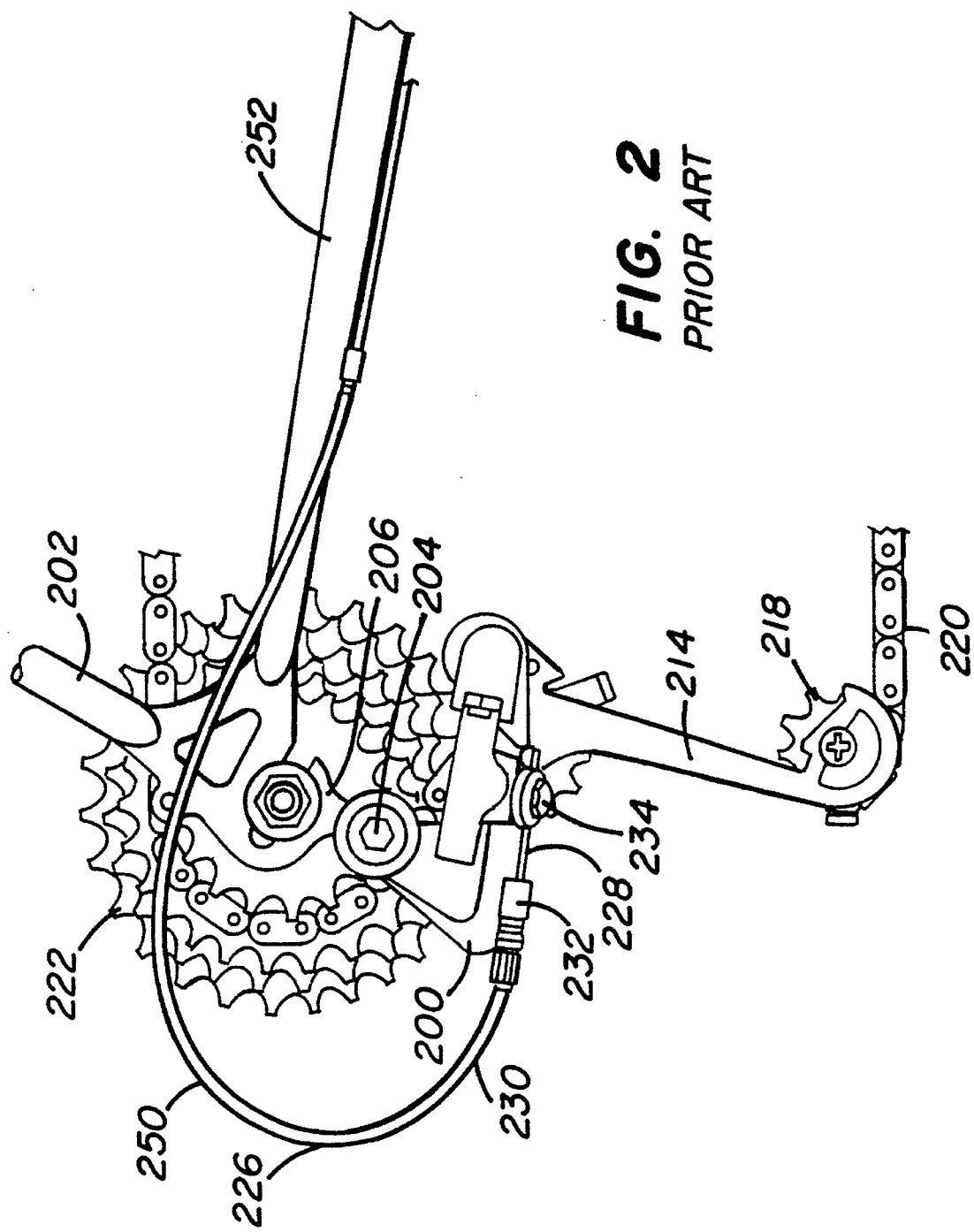
FIG. 2 is an enlarged fragmentary elevational view of a prior art derailleur.
Figure 3:
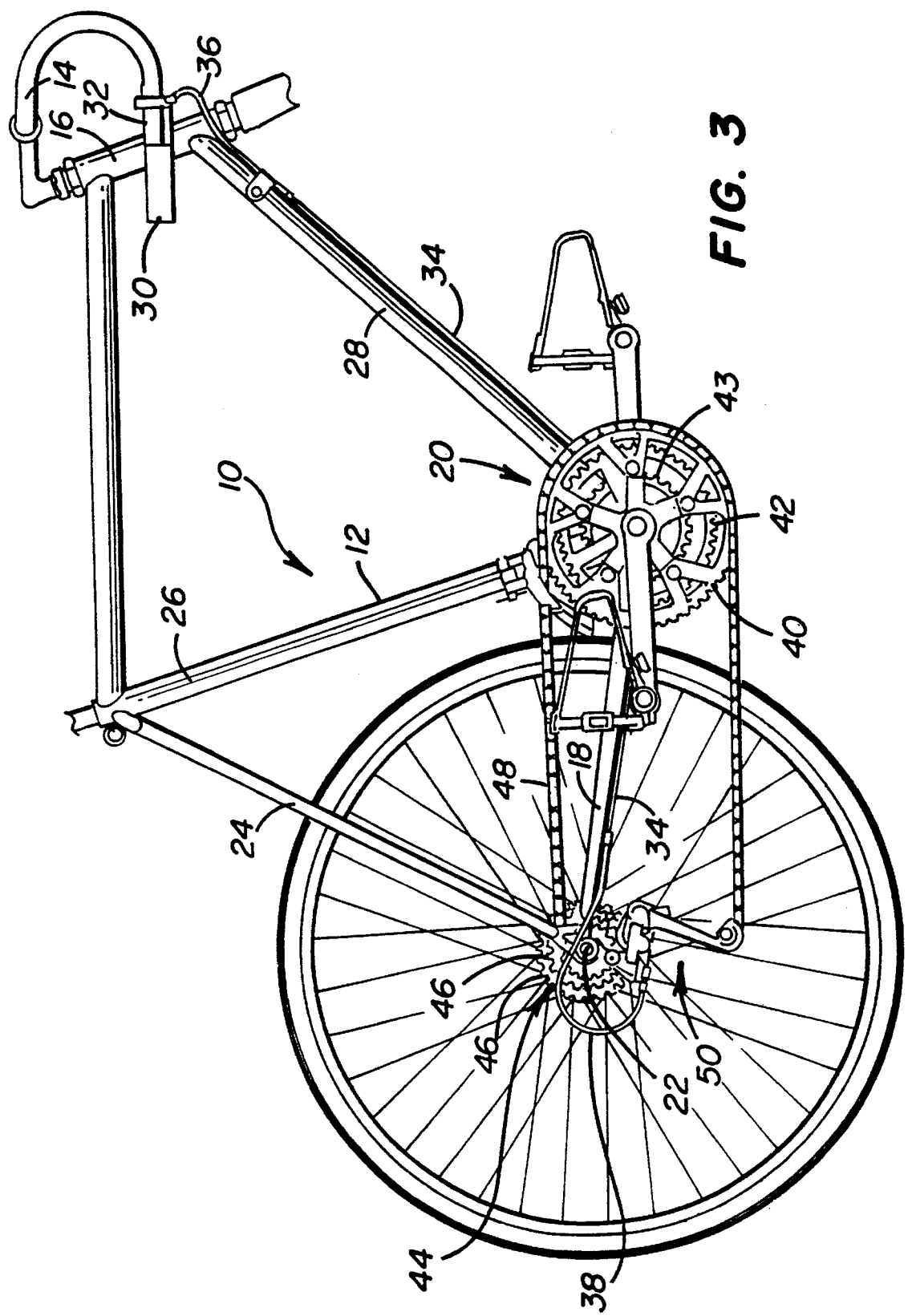
FIG. 3 is a elevational view of relevant portions of a multiple gear bicycle which uses a rear derailleur according to the invention.

Referring first to FIG. 3, a bicycle incorporating the invention is indicated generally at 10. Bicycle 10 includes a frame 12 and handlebar 14 inserted into a fork tube 16. The members of the frame 12 include a chainstay 18 disposed between a crank indicated generally at 20 and a rear hub 22, a seat stay 24 disposed between the hub 22 and the top of a seat tube 26, and a down tube 28 which is disposed between the fork tube 16 and crank 20.

As illustrated in FIG. 3, disposed on the end of the handlebar 14 is a static grip 30. Fitting immediately inboard of grip 30 is preferably a hand-rotatable shift actuator 32 by which the rider displaces a control cable 34. According to the invention, various shift actuators may be employed; reference is made, for example, to the shift actuators disclosed in U.S. Pat. Nos. 5,197,927 and 5,102,372 and U.S. patent application Ser. No. 08/295,370 filed Aug. 24, 1994. These U.S. patents and pending U.S. Patent application are fully incorporated by reference herein.

The noted shift actuators include two conventional methods to achieve the desired "cable pull rate": shovel cam and jackspool. Although each method may be employed within the scope of the invention, as discussed in detail herein, in a preferred embodiment of the invention, the shift actuator 32 employs a simple spool method to obtain an optimal relationship between shifter rotation and derailleur actuation (degrees of grip rotation per shift).

The control cable 34, which preferably is a multi-filament alloy or steel cable, is of the Bowden type; that is, portions of it are housed in an outer housing or sheath. For example, the upper end of the cable 34 resides within a housing portion 36. Another cable portion resides within a cable housing 38 near the rear hub 22 of the bicycle 10.

In road bikes, the crank 20 would generally have only two chain rings 40 and 42. However, in mountain bikes, the crank 20 can have a third chain ring 43 and the diameter of the smallest chain ring 43 can be substantially different from that of the largest chain ring 40. This causes problems in the maintenance of a relatively constant freewheel chain gap, as will be explained below.

A freewheel indicated generally at 44 has a plurality of sprockets 46 which are of various sizes. As in crank 20, when the bicycle 10 is configured as a mountain bike, the sprocket sizes can be substantially different from each other. A conventional bicycle drive chain 48 is routed from a selected one of the chain rings 40, 42, 43 around the crank 20 to a selected one of the sprockets 46 on the rear of the bicycle, allowing the rider to select a gear ratio from a combination of chain ring and sprocket sizes.

A derailleur indicated generally at 50 shifts inboard (toward the center line of the bicycle) or outboard (away from the center line of the bicycle) in order to accomplish a shift between different ones of the sprockets 46 within freewheel 44. The derailleur movement is actuated by pulling or releasing the control cable 34 via a shift actuator.

Figure 3A:
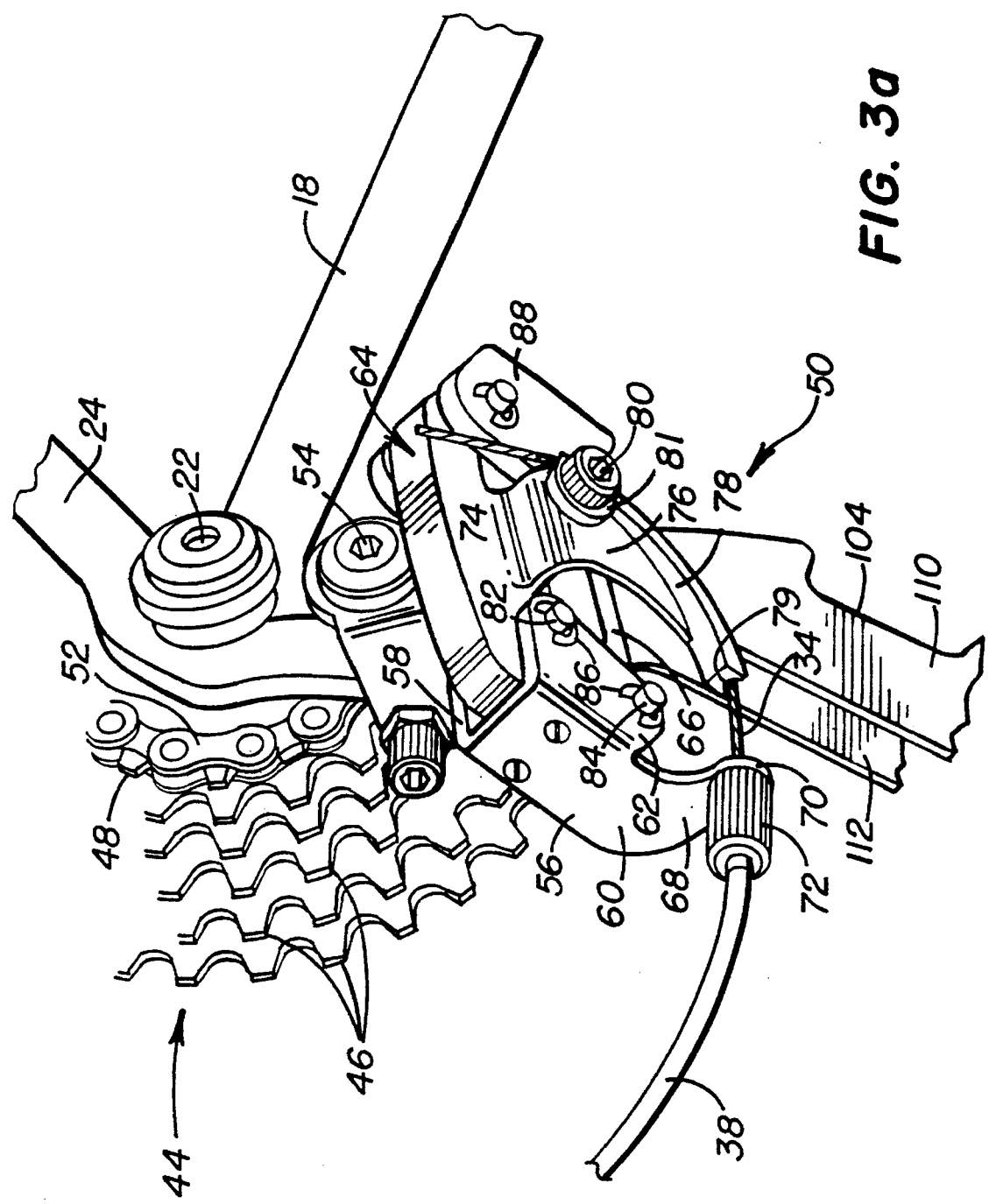
FIG. 3a is an isometric detailed view of a rear derailleur according to the invention.

The derailleur 50 of the invention is illustrated in more detail by the isometric view provided in FIG. 3a. The derailleur 50 is affixed to the bicycle via a derailleur hanger 52 and bolt 54. In some embodiments of the invention, the derailleur 50 is rotatable around its hanger attachment bolt 54. However, in a preferred embodiment, the derailleur 50 does not articulate around bolt 54. Among other considerations, the number of articulations of components of the bicycle in contact with chain 48 should be minimized to prevent bouncing resonance of the chain 48 in the rigorous "technical" portions of the trails encountered in mountain cycling, which otherwise could lead to derailment of chain 48 from the chain ring when back pedaling.

The portion of the derailleur 50 which is preferably rigidly affixed to the derailleur hanger 52 is termed the b-knuckle or b-pivot 56. The b-knuckle 56 is preferably cast or molded as a single integral part. An arm 58 provides the attachment to the derailleur hanger 52 via bolt 54. The b-knuckle 56 further includes a bottom or crosspiece 60. An outboard connecting arm or flange 62 stands up from the crosspiece 60, as does the inboard arm or flange 58 so as to receive a pair of sideplates 64 and 66. An extension 68 of the bottom portion 60 forms an orifice 70 which, in the embodiment illustrated in FIG. 3, receives a cable housing ferrule or socket 72. This terminates an end (not shown) of the lower cable housing 38.

The outboard or upper sideplate 64 has mounted on it (or preferably has integrally formed with it) a bracket 74 which extends outwardly in a direction perpendicular to the plane of articulation of the sideplate 64. At an outer end of the bracket 74, a downwardly or inwardly (depending on one's frame of reference) extending support flange or entrainer plate 76, is formed in a plane which is preferably parallel to the plane of articulation of the sideplate 64. In the illustrated embodiment, the flange 76 makes an angle of approximately 90° with the bracket 74. In additional embodiments, the flange angle may be >90° or <90°.

Flange 76 is provided as a structural support for an arcuate channel or entrainment surthce 78 which, as will be described in more detail below, acts to entrain and direct cable 34 from a first direction as the cable 34 exits orifice 70 to a second direction as cable 34 approaches a sideplate cable clamp 80. The entrainment surface 78 may be grooved as at 79 to receive cable 34. In additional embodiments of the invention, discussed below, the entrainment surface 78 may comprise a series of studs or arcuate segments. The cable clamp 80 is, in the illustrated embodiment, also mounted on the flange 76.

The cable clamp 80 is affixed to the support flange 86 by means of a bolt 81. The cable clamp 80 affixes cable 34 to the sideplate 64 proximate an end of cable 34. As illustrated in FIG. 3, there is usually a "pigtail" portion of cable 34 which extends beyond clamp 80.

As discussed above, flange or leg 58 and flange 62 form a cradle for sideplates 64 and 66. The sideplate 64 is rotatably affixed to the b-knuckle 56 via a pin or pivot 82. An end of the inboard or lower sideplate 66 is rotationally affixed to the b-knuckle 56 through a pin 84. The sideplates 64 and 66, pins 82 and 84 and b-knuckle 56 are assembled together with the aid of snap rings 86 in the illustrated embodiment; of course, alternative fasteners such as rivets or bolts and nuts may also be employed.

Figure 4:
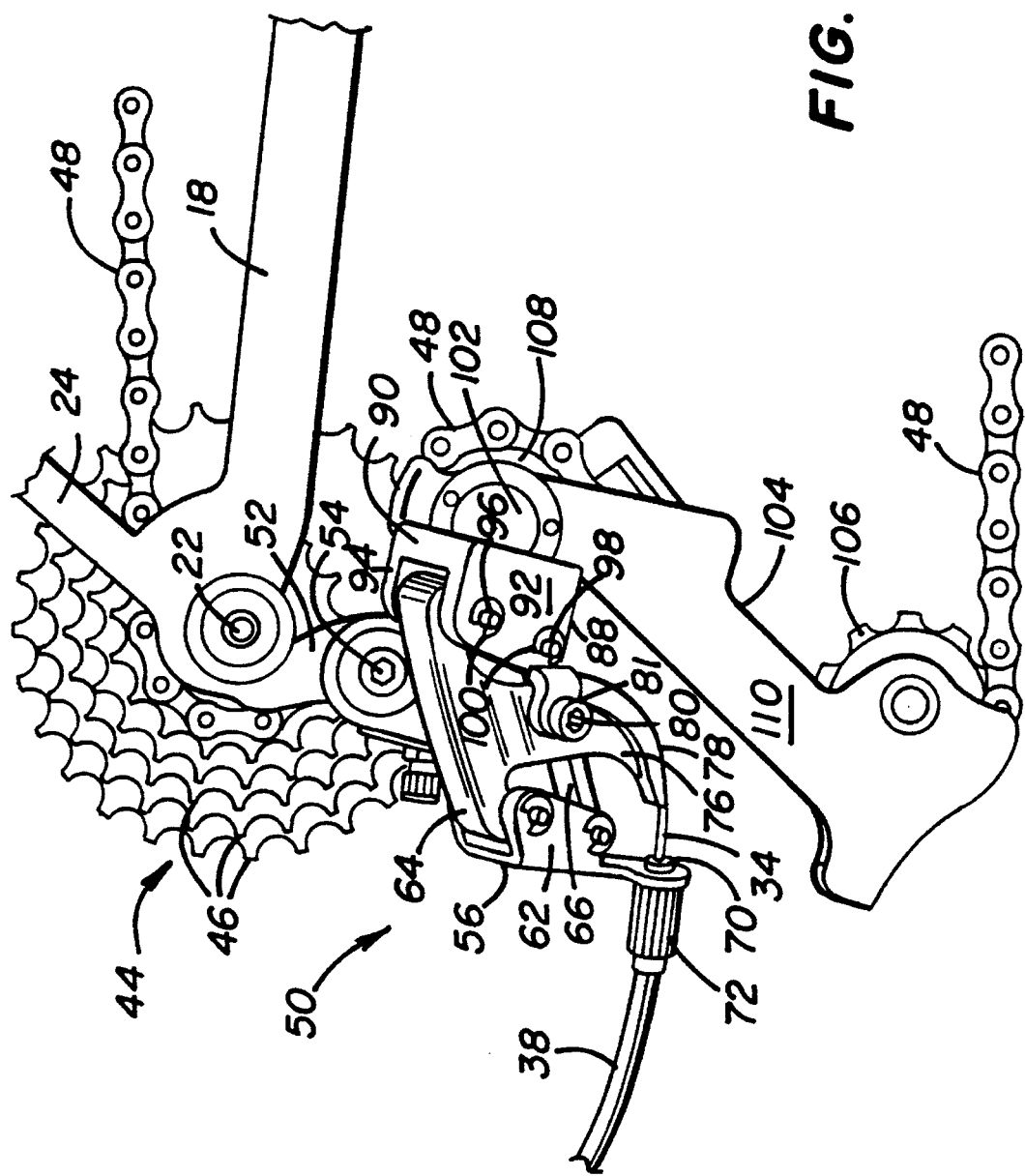

The other ends of the outer and inner sideplates 64 and 66 are rotationally affixed to a movable p-knuckle 88 (see FIG. 4). Similar to the b-knuckle 56, the p-knuckle 88 includes a base or crosspiece 90 from which extends an outer flange or arm 92 and, in opposition to this, an inner flange or arm 94. The flanges or arms 92 and 94 extend rearwardly from the base or crosspiece 90 at opposite ends thereof. Arms 92 and 94, in conjunction with the base or crosspiece 90, form a cradle for receiving the other ends of the sideplates 64 and 66; these ends are rotationally affixed to the p-knuckle 88 via corresponding pins 96 and 98, and are held in place in the illustrated embodiment by snap rings 100. The b-knuckle 56, p-knuckle 88, outboard sideplate 64 and inboard sideplate 66 form a parallelogram as per conventional derailleur practice.

Rotatably affixed to the p-knuckle 88 via a pivot 102 is a guide wheel idler cage 104. In a preferred embodiment, the idler cage 104 has rotationally affixed thereto a lower guide wheel 106 and an upper guide wheel 108 (see FIG. 10). The idler cage 104 includes an outboard idler cage plate 110 and an inboard idler cage plate 112 (FIG. 3a); the axes of the upper and lower guide wheels 108 and 106 extend between and are supported by these cage plates 110 and 112.

Figure 5:
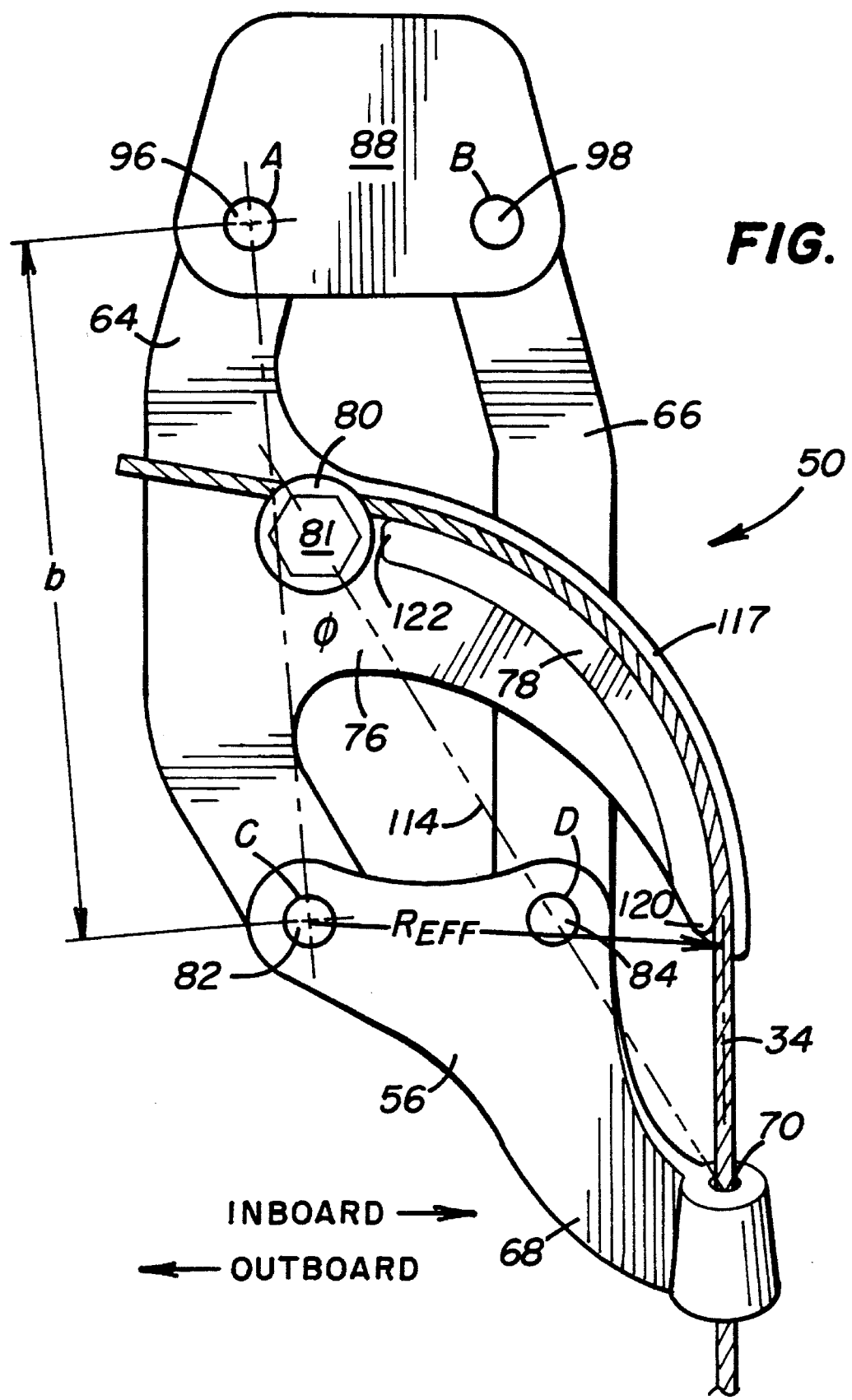
FIG. 5 is a detailed elevational view of the rear derailleur, showing in particular the p-knuckle, b-knuckle, sideplates and control cable entrainment surface.
Figure 5A:
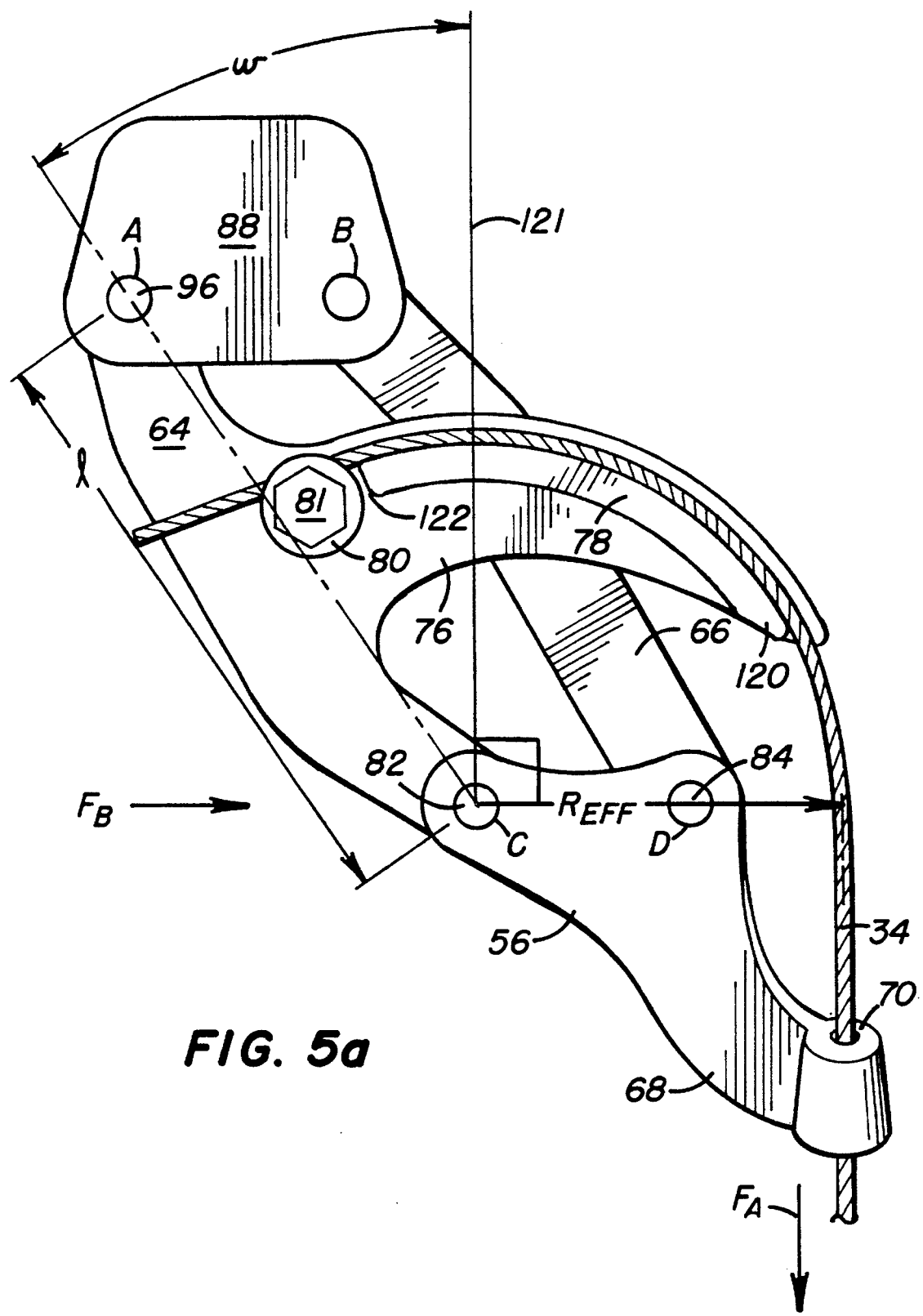
FIG. 5a is a detailed elevational view of the rear derailleur shown in FIG. 5, illustrating a more outboard position.

The geometrical relationship of the b-knuckle 56, p-knuckle 88, sideplate 66 and cable entraining surface 78 is shown in more detail in FIGS. 5 and 5a. Referring particularly to FIG. 5, a tensioning spring (not shown) is provided so as to urge the pulling of the cable 34 out of the orifice 70 in the direction of the sideplate 64. Such a tensioning spring can, for example, be provided by the use of a linear spring attached between the pins or axes 82 and 98. Alternatively, a coil spring can be wrapped around either axis 82 or axis 98, or both, in order to urge the parallelogram (defined by points A, B, C, and D) into a more oblique relationship, whereby the angles made between lines drawn between pivots 96, 82 and 84, and lines drawn between pivots 96, 98 and 84, are made more obtuse. The tensioning spring will tend to urge the p-knuckle 88 leftward or outboard.

Referring to FIG. 5a, the force resulting from the tensioning spring (and frictional forces) is generally referred to as the "bias force" and is denoted as $F_B$. The force exerted by the cable is commonly referred to as the actuation force, denoted as $F_A$.

Conventional derailleurs do not employ the arcuate cable entraining surface 78 or supporting flange 76. Therefore, in conventional derailleurs cable 34 generally follows a path directly from the b-knuckle orifice 70 to the cable clamp 80, as indicated by the dashed line 114 shown in FIG. 5. This has several drawbacks. First, as the p-knuckle 88 moves in an outboard direction (see FIG. 5), an angle φ between 114 and a line drawn between line pivots 82 and 96 becomes more and more acute. This causes an increase in the actuation ratio as one moves to smaller or outboard sprockets. This is graphically illustrated in FIG. 10c, specifically curves 116, 117 and 118, which are graphs of the actuation ratio to sprocket position of several conventional derailleurs, with the first sprocket (No. 1) being the smallest and most outboard of the sprocket set.

Second, the force necessary to draw the p-knuckle 88 back in a rightward or inboard position increases as a function of its initial outboard displacement; the more outboardly displaced the p-knuckle 88 is, the less of a vector component is available to urge the sideplate 64 and therefore the p-knuckle 88 in an inboard direction. Third, cable 34 exhibits a sharp angle as it exits the orifice 70 when the derailleur 50 is in one of its more outboard positions. This causes sluggish performance, increased friction and wear on the cable 34 and, ultimately, premature failure of cable 34.

The present invention substantially reduces or eliminates the above-noted problems by providing a control cable entrainment surface 78 which displaces the cable in an inboard direction from the line 114, and in opposition to pivot 82. In the embodiment illustrated in FIG. 5, the cable entrainment surface 78 is a circular arc having a first end 120 and a second end 122, with the second end 122 being proximate to the end of the cable 34 which is clamped by cable clamp 80. Preferably, surface end 120 is closer to the b-knuckle orifice 70 than end 122. In this configuration, the actuation ratio is a function of the effective radius R of the cable entrainment surface 78 as measured at the point of departure of the cable 34 from the surface 78. In the position illustrated in FIG. 5, the point of departure is the same as end 120.

By the term "effective radius" it is meant to mean the following: in the case that the entraining surface forces the cable to follow a path that is a constant distance from the pivot C see (FIG. 9b), the effective radius $R_{EFF}$ is simply the outside radius of the entrainment surface plus half the thickness of the cable. In the more general case where the entraining surface does not force the cable to follow a path that is a constant distance from pivot C (see FIGS. 9a and 9c) the effective radius is the perpendicular distance from the middle of the cable to the center of pivot C.

Referring to FIG. 5a, the actuation ratio of the amount of cable 34 displaced to the amount of movement of p-knuckle 88 in a direction parallel to the freewheel axis is $$\frac{l}{R} \cos\omega\cos\theta$$

where l is the sideplate length between pivots 96 and 82; R is the effective radius; ω is the angle formed between line 96–82 of the derailleur parallelogram with respect to line 121, which is vertical and parallel to a plane containing any one of the freewheel sprockets 46 (see FIG. 3); and θ (see FIG. 11 ) is the angle formed between the parallelogram plane (including sideplate 64) with a (horizontal) line parallel to the freewheel axis 148 according to the invention as illustrated in FIG. 5a. In the embodiment illustrated in FIG. 5a, where R is constant, the actuation ratio will remain substantially uniform across the range of motion of the p-knuckle 88.

As illustrated in FIG. 5, in conventional derailleur systems the cable is pulled along dashed line 114 (see FIG. 5). In this instance, the amount of movement of the p-knuckle 88 varies as the sine of the angle φ between an extension of line 114 and a line drawn from pivots 82 to 96. Since this angle φ changes as more cable is pulled, its sine function does also, causing an adverse variation in actuation ratio.

FIG. 5 also illustrates a preferred form of the entrainment surface 78. An upstanding arcuate lip 117 is formed at right angles to surface 78 proper so as to form a channel or a groove through which the cable 34 may be entrained. It is preferred that the cable entrainment surface 78 otherwise be open in order to allow the removal of foreign matter and to prevent fouling of cable 34.

Figure 6:
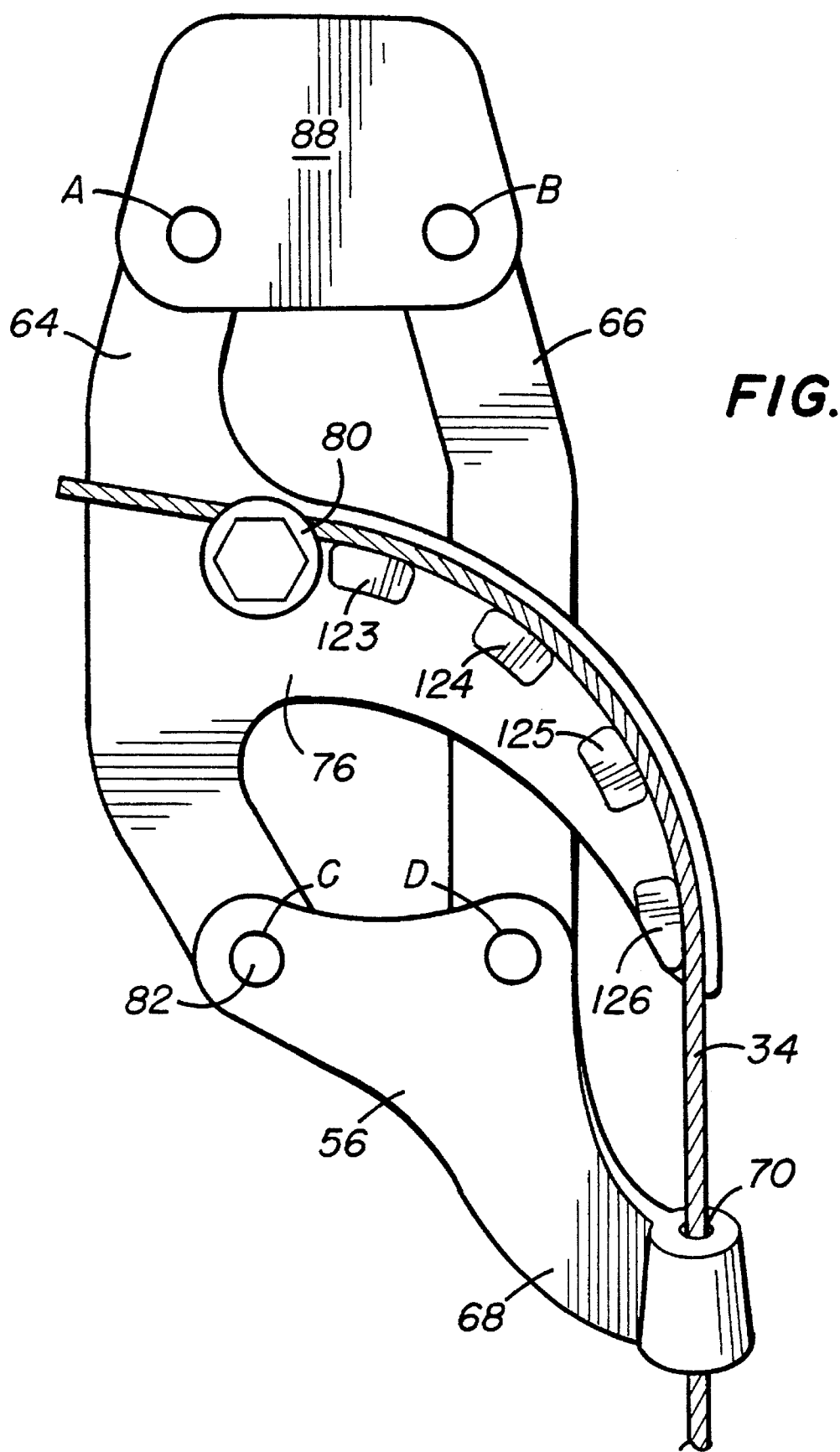
FIG. 6 is an elevational view of a derailleur corresponding to FIG. 5, showing an alternative embodiment of a cable entrainer.

The arcuate cable entrainment surface 78 illustrated in FIG. 5 may be replaced with one or more cable entrainment surfaces or other actuation regulators, as long as the cable 34 is displaced from line 114 in a direction opposite to pivot 82. One such alternative embodiment is illustrated in FIG. 6. In place of a unitary cable entrainment surface, a plurality of arc surface segments 123, 124, 125 and 126 are provided, which act to position the control cable 34 to substantially the same path as entrainment surface 78 (FIG. 5). The arcuate (or even flat) segments 123–126 are spaced from each other along the control cable path to further mitigate the accumulation of foreign matter. Each of the surface segments 123–126 projects perpendicularly from entrainer plate 76.

Figure 7:
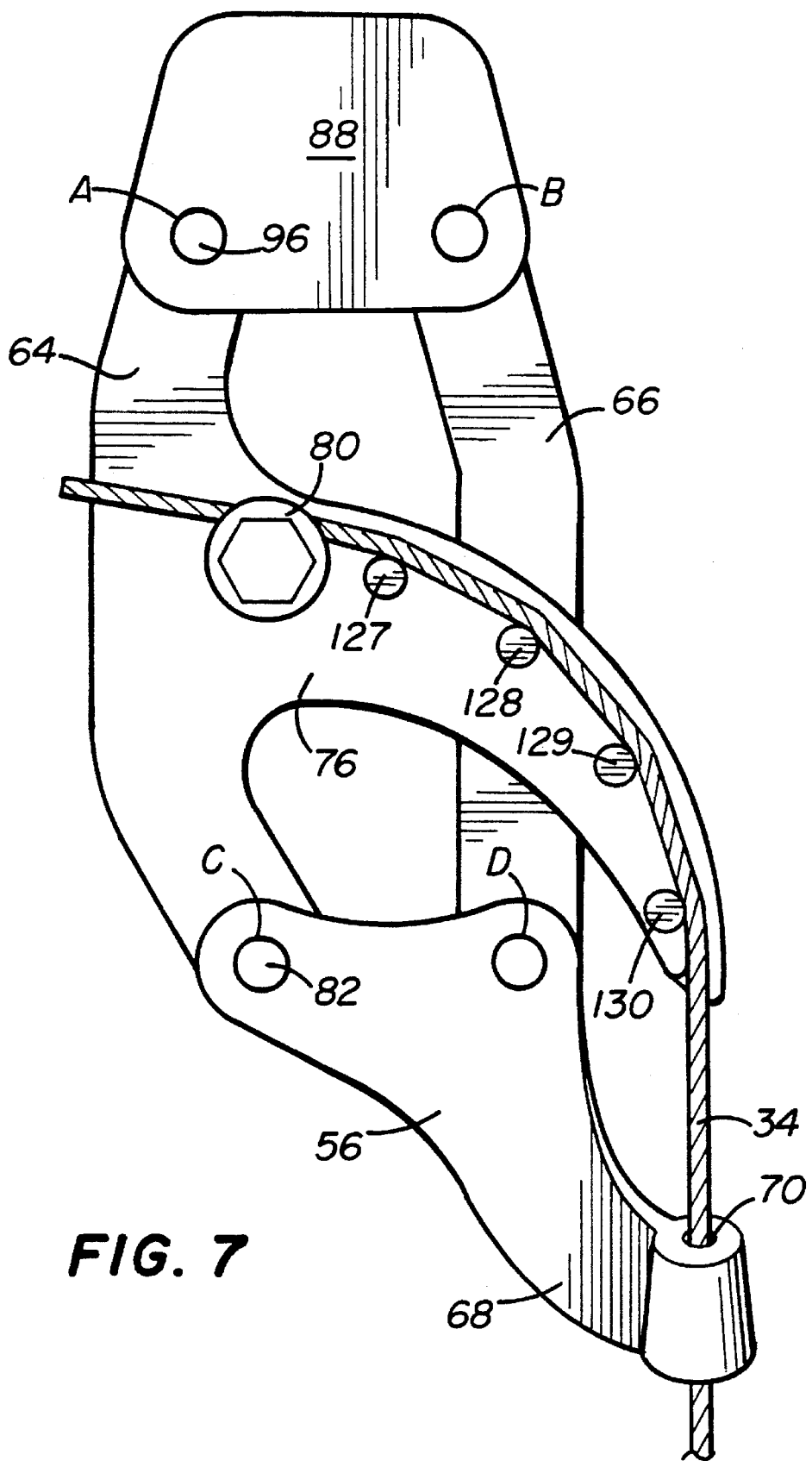
FIG. 7 is a second alternative embodiment of a rear derailleur employing cylindrical studs as control cable entraining surfaces.

FIG. 7 illustrates an additional embodiment in which the entrainment surface 78, shown in FIG. 5, is replaced with a plurality of pins or studs 127, 128, 129 and 130 that are spaced along the desired cable entrainment path. While the actuation ratio in this embodiment will be slightly "bumpy" since the cable entrainment surface is not a continuous circular arc, an approximately constant actuation ratio is still obtained. Where it is desired to hold the actuation ratio more constant, additional pins 127–130 can be provided; where the accumulation of water and foreign matter is to be minimized, the number of pins 127–130 should be fewer. As in surfaces 123–126 (FIG. 6), the pins or studs 127–130 preferably project in a direction perpendicular to entrainer plate 76. Pins or studs 127–130 may be cylindrical in shape for ease of manufacture and assembly. The pins or studs 127–130 are preferably affixed to entrainer plate 76 by conventional means, such as mating or engagement holes (not shown) in entrainer plate 76.

Figure 8A:
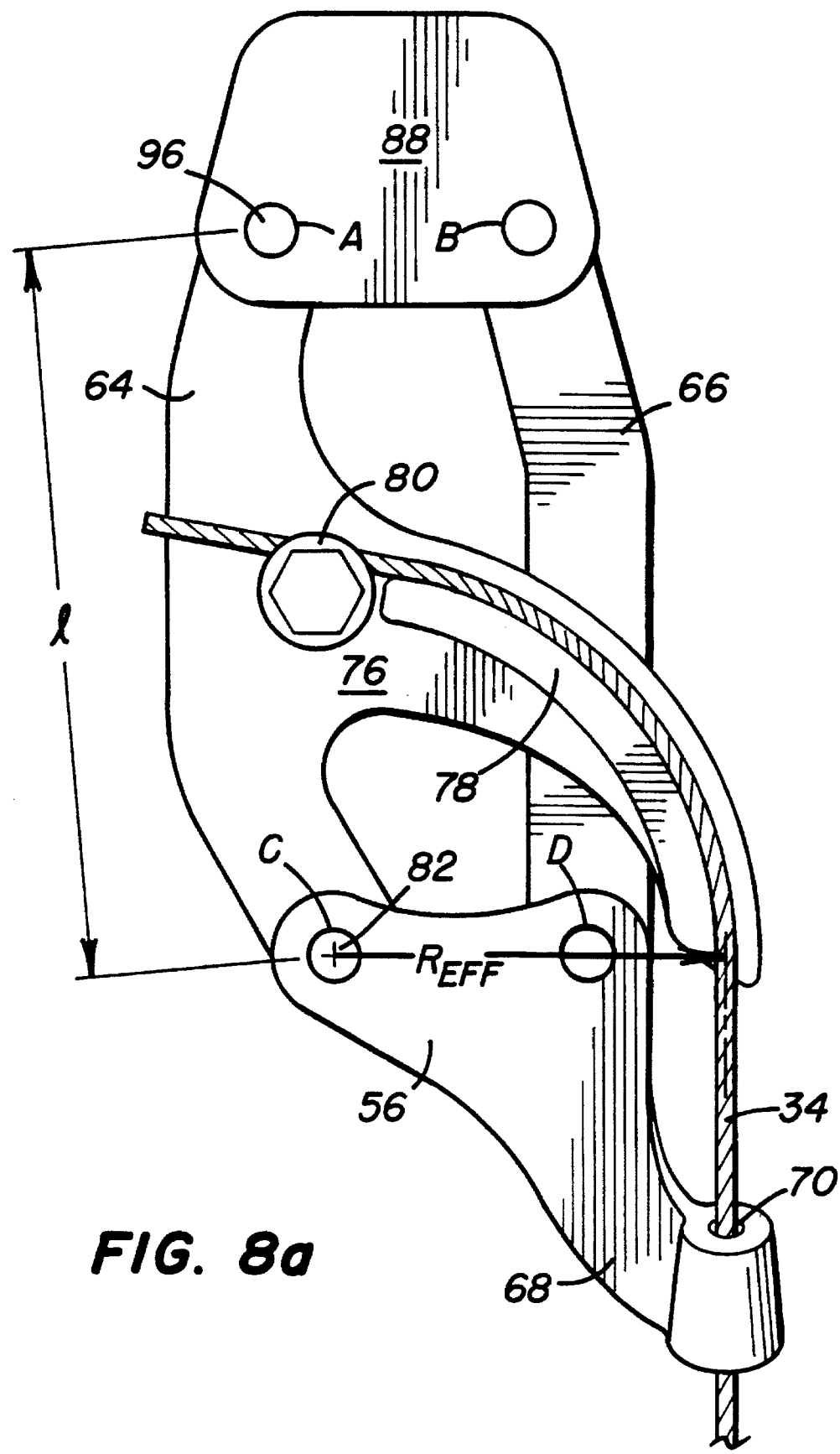
FIGS. 8a, 8b and 8c illustrate alternative embodiments of the invention, showing in particular the variation in control cable effective radius according to the invention.
Figure 8B:
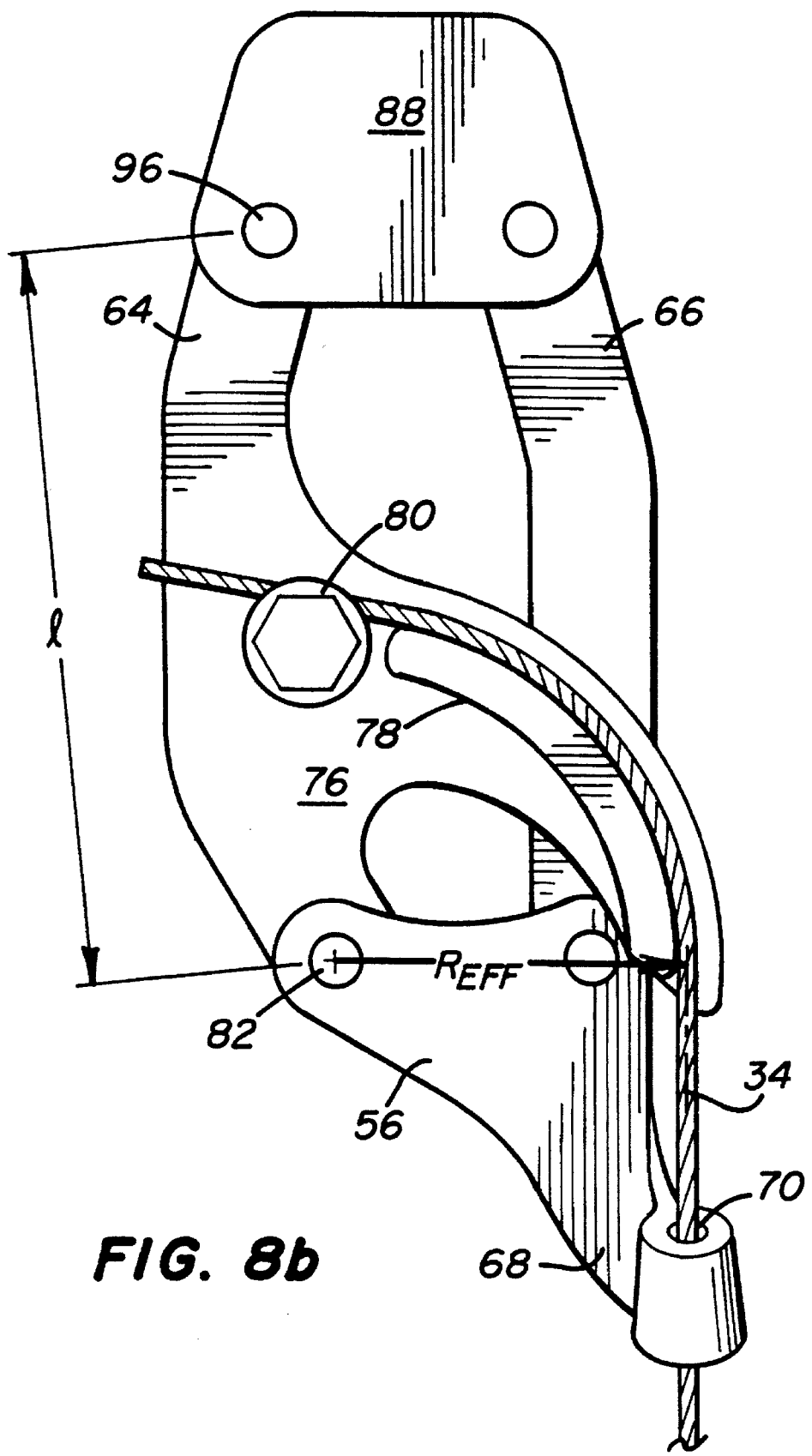
Figure 8C:
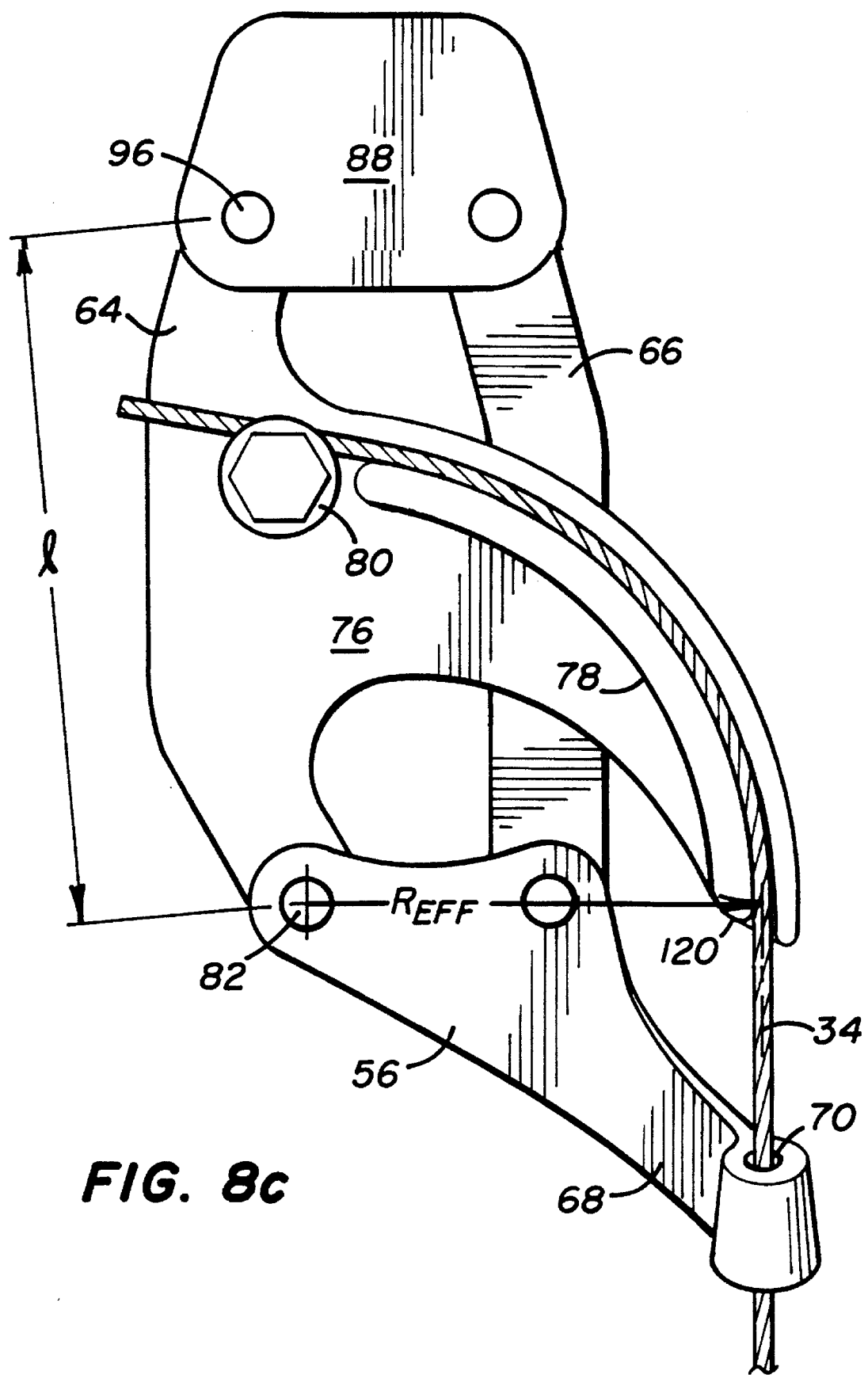

FIG. 8a–8c illustrate additional embodiments wherein the actuation ratio is varied by decreasing or increasing the effective radius $R_{EFF}$ of the cable entrainment surface 78. Referring to FIG. 8a, the effective radius $R_{EFF}$ has been reduced and orifice 70 has been displaced in an outboard (leftward) direction. The resultant actuation ratio (l/R) cosωcosθ is, thus, increased. Referring to FIG. 8b, the effective radius $R_{EFF}$ has been decreased still further and the orifice 70 has been displayed further in an outboard direction, causing a further increase in the actuation ratio. In FIG. 8c, the effective radius $R_{EFF}$ has been increased from the embodiment shown in FIG. 5, such that the actuation ratio is reduced. According to the invention, to eliminate binding of cable 34, the b-knuckle orifice 70 is positioned inboard in alignment with the end 120 of cable entrainment surface 78. The entrainment surface 78 is preferably positioned such that cable 34 exhibits an angle of no less than 80 degrees with respect to a plane containing cable orifice 70. In additional embodiments, the cable angle may be less than 80°.

Figure 9A:
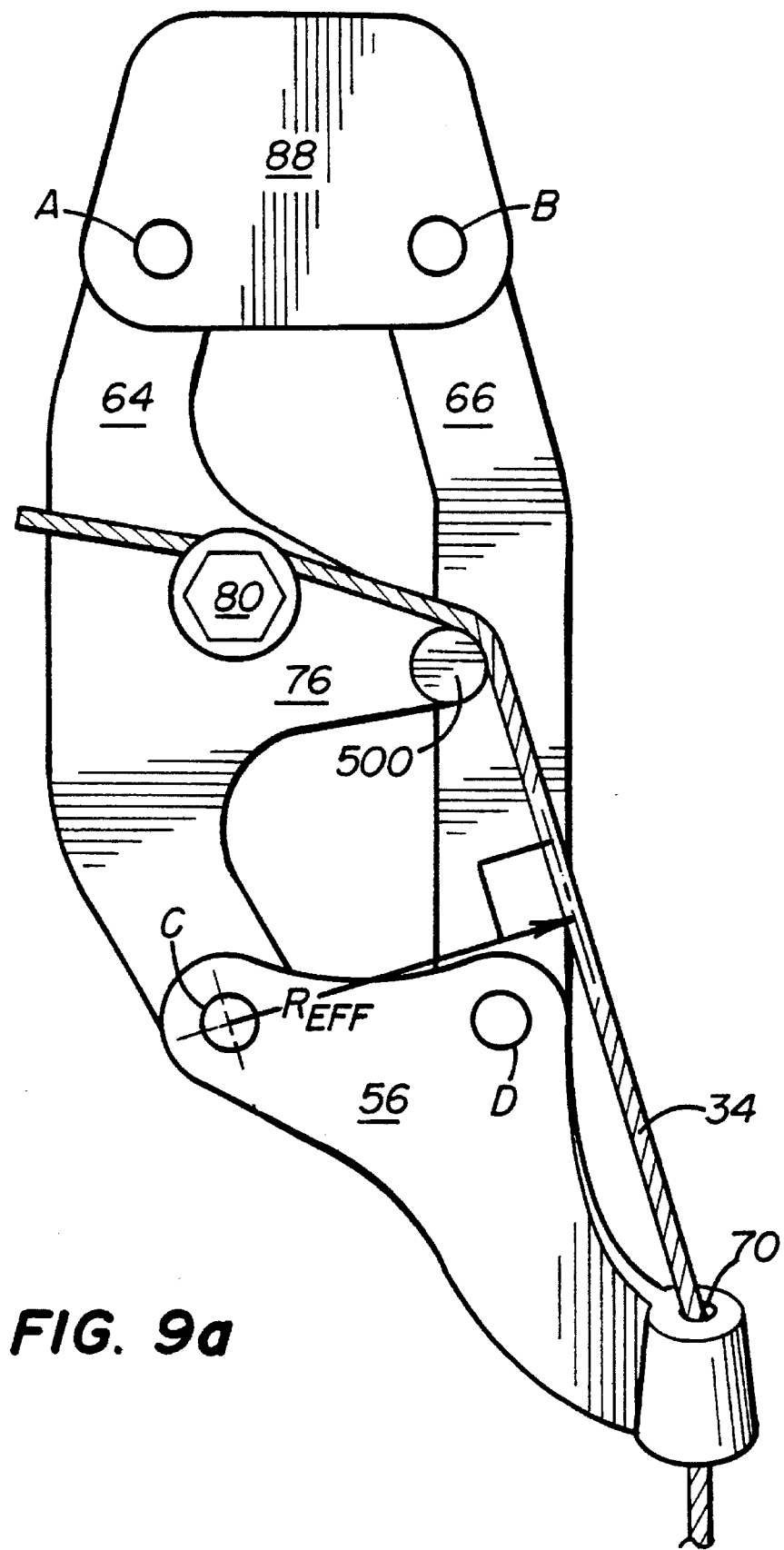
FIGS. 9a, 9b and 9c illustrate various cable entraining surfaces, showing further variations in control cable effective radius.
Figure 9B:
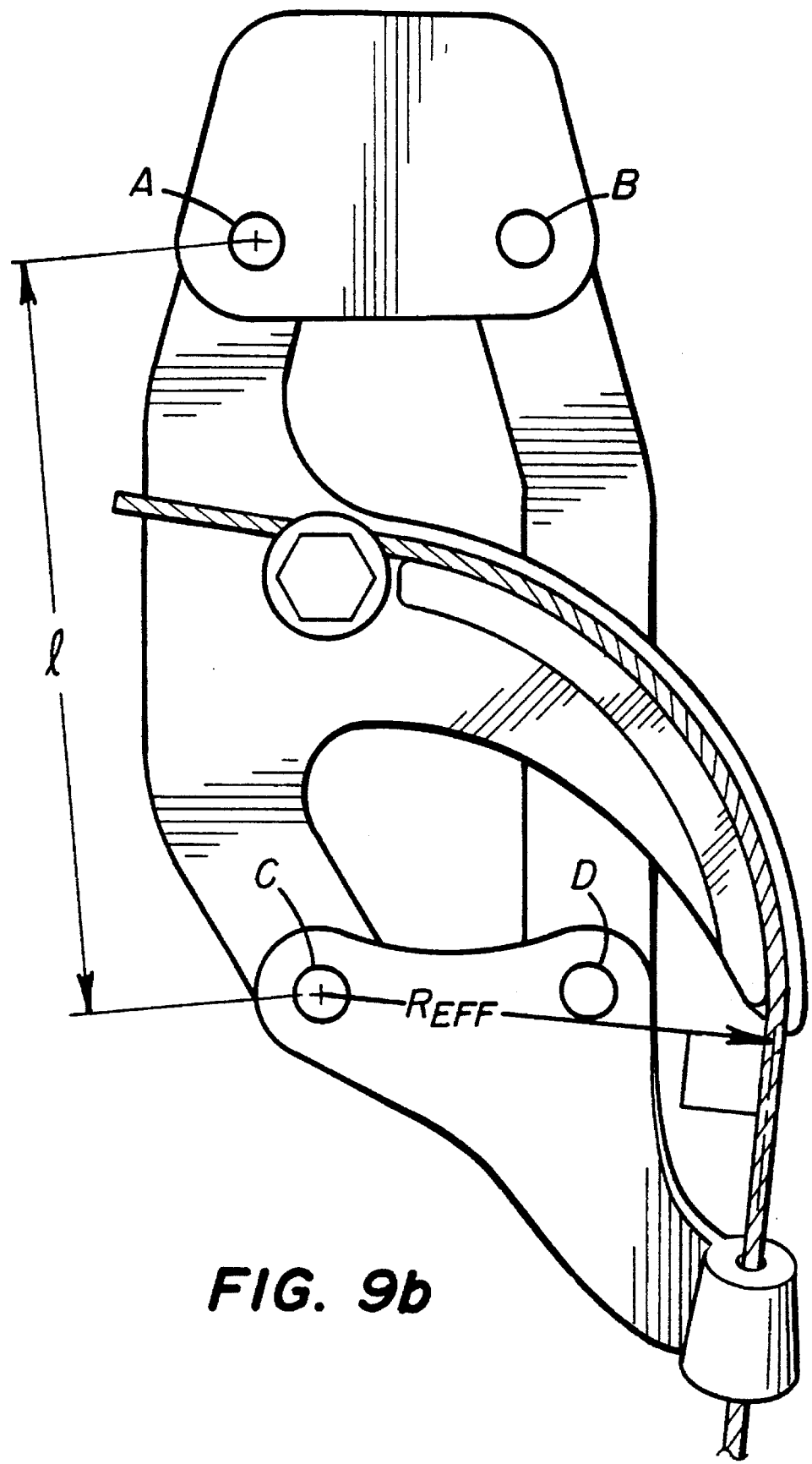
Figure 9C:
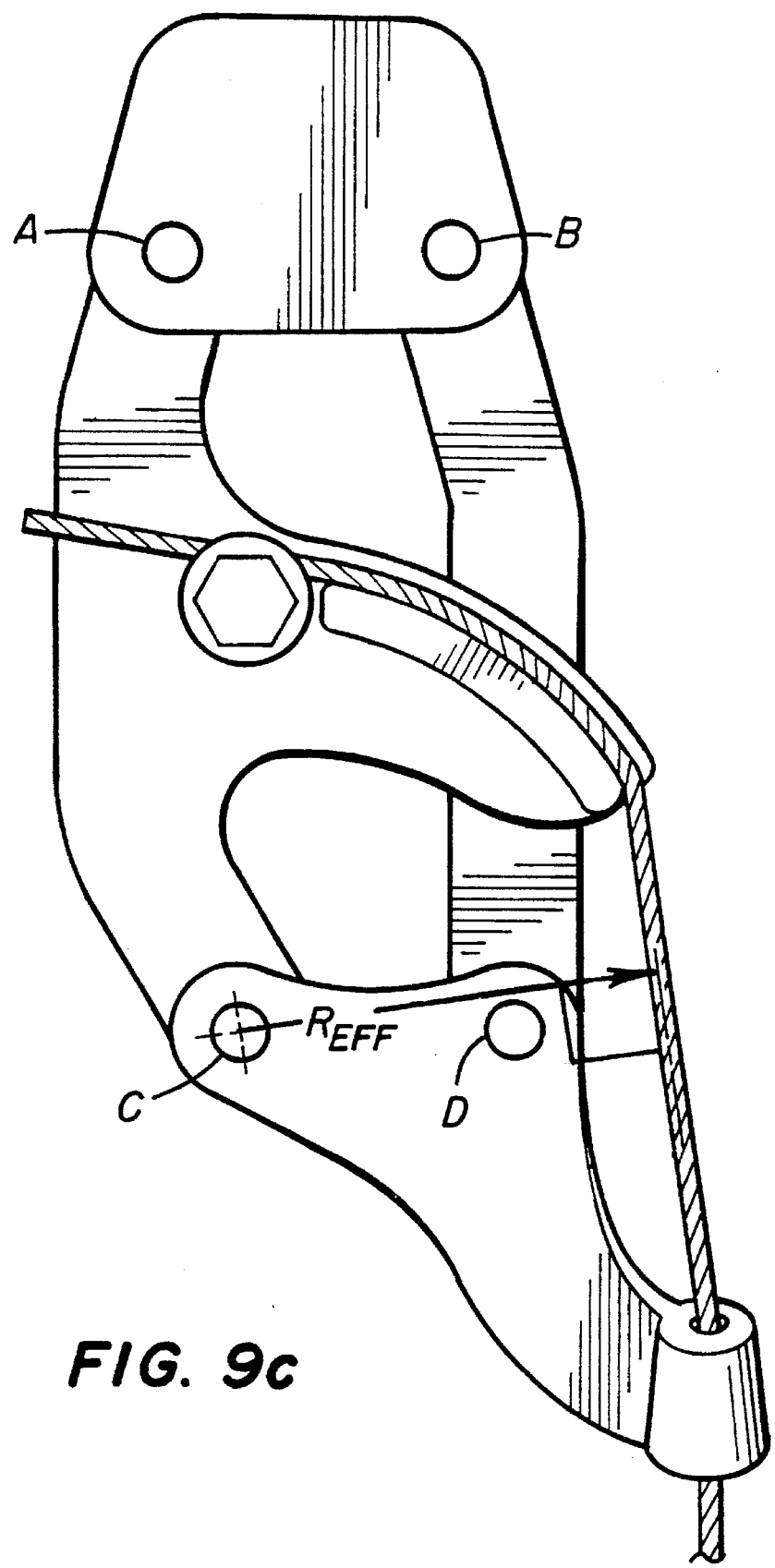

FIGS. 9a–9c illustrate alternative embodiments of the invention. In FIG. 9a, the cable entraining surface has been replaced with a guide wheel 500 which preferably is rotatably mounted on the end of the supporting flange 76, and which may include a circumferential groove (not shown) for the entrainment of cable 34. Since the guide wheel 500 acts to displace the cable 34 away from a line connecting cable clamp 80 from p-knuckle orifice 70, there will be an improvement in the uniformity of the actuation ratio. In FIG. 9b, the cable entrainment surface 78 has been extended toward the p-knuclde orifice 70 (i.e., increased $R_{EFF}$). In FIG. 9c, the cable entrainment surface area has been reduced in comparison with the embodiments shown in FIGS. 8a–8c. FIGS. 9a and 9c also illustrate embodiments where the effective radius $R_{EFF}$ is not constant.

Referring now to FIGS. 10a–10d, graphs are presented of actuation ratio versus sprocket position curves for each of a plurality of conventional derailleurs. In each of FIGS. 10a–10d a similar curve 132 is shown for the derailleur according to the invention.

Figure 10A:
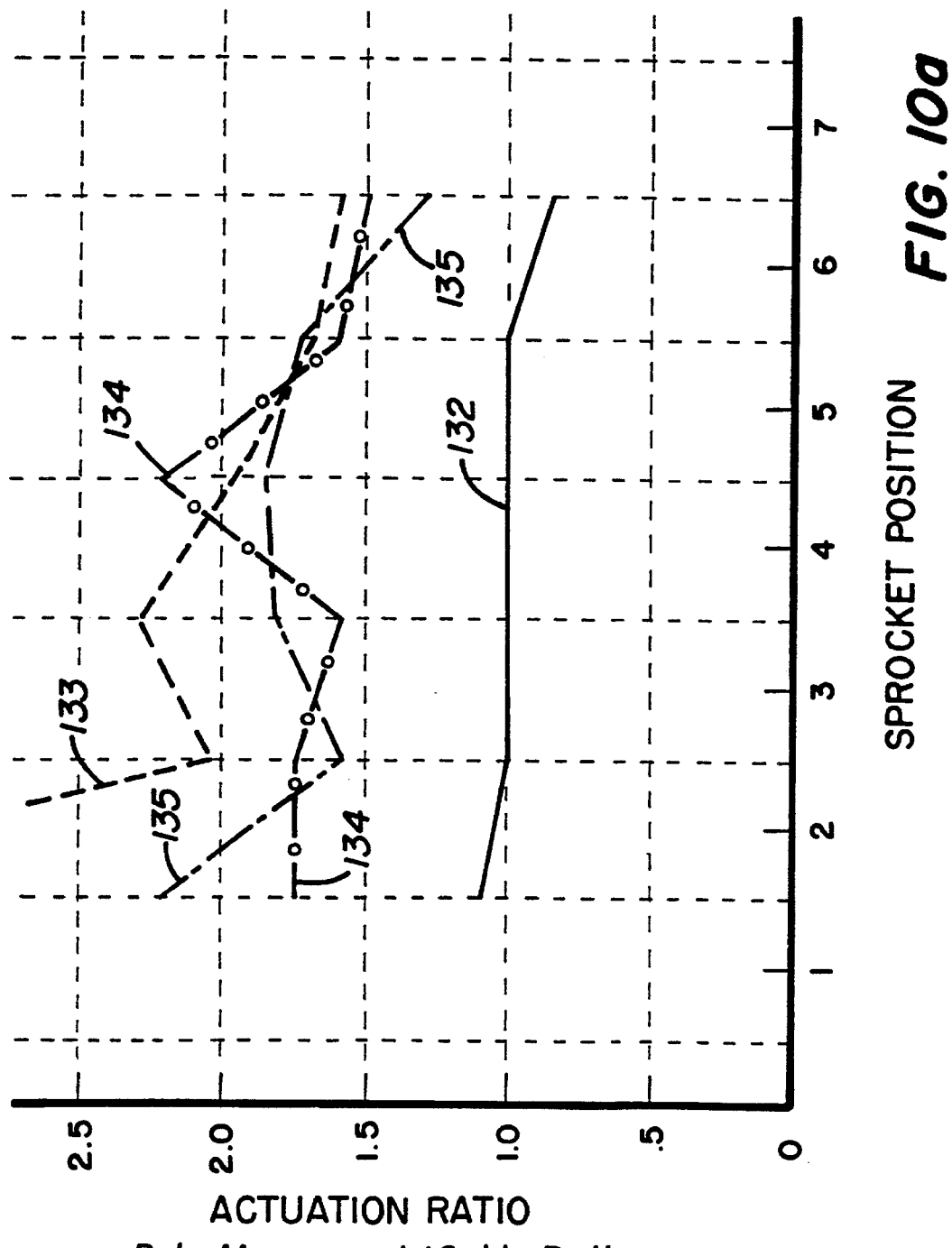

Curves 133–135 in FIG. 10a graphically illustrate that the actuation ratio of conventional derailleurs varies significantly between sprocket positions and generally exhibits a steep decline between the most outboard and the most inboard of sprocket positions. In contrast, the actuation ratio for the derailleur of the present invention, Curve 132, is maintained below 1.5:1 (about 1.1 for the most outboard sprocket position to about 0.9 for the most inboard sprocket position) and has a mean actuation ratio in the range of 1.4–0.5:1, preferably 1.2–.7:1, more preferably 1.1–.9:1. Not only is the actuation ratio of the present invention considerably lower than that of the conventional derailleur, the "bandwidth" or variation in actuation ratio is much smaller than that of conventional derailleurs.

Figure 10B:
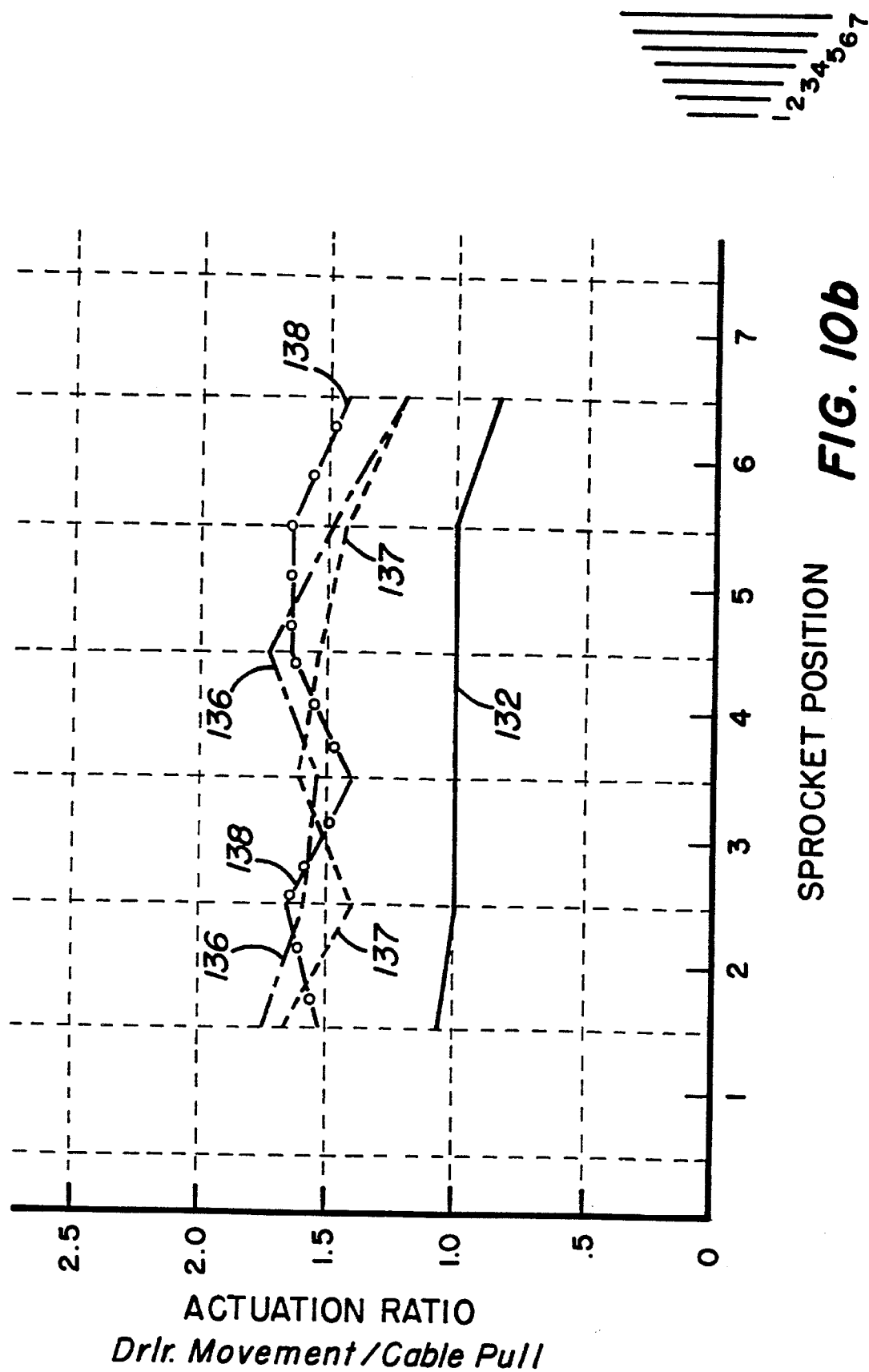

Referring now to FIG. 10b, actuation ratio versus sprocket position curves for three conventional derailleurs that are designed for use with hand-rotatable shift actuators are illustrated. It is noted that each of these derailleurs has an actuation ratio that is higher than the derailleur of the invention, and further exhibits a higher mean actuation ratio. Each of the noted derailleurs is associated with a shift actuator which bears directly on the handlebar (i.e. no protective mandrel or sleeve).

Referring to FIG. 10c, there are shown actuation ratio versus sprocket position curves (116–118) for several conventional road bike derailleurs designed for use with the once-popular small downtube levers. The small spool on the downtube lever translates into a high derailleur actuation ratio, which in these conventional levers ranges from about 2.6 to about 1.6:1 depending on sprocket position. There is also a large actuation ratio "bandwidth".

FIG. 10d illustrates a pair of curves for two additional conventional road bike derailleurs. Curve 152 represents a derailleur that has what may be referred to as a cable spooling surface on its "b" knuckle. Curve 153 represents a derailleur that has what may be referred to as a cable spooling surface on its "p" knuckle. Despite these surfaces, neither derailleur provides a relatively uniform or constant actuation ratio over the entire range of sprocket positions. Furthermore, both of the conventional derailleurs have substantially higher actuation ratios than that of the present invention.

As compared with conventional derailleurs illustrated in FIGS. 10a–10d, the actuation ratio of the present invention among sprocket positions is substantially uniform (alternatively stated, the actuation ratio has a smaller "bandwidth") as well as being significantly lower than any actuation ratio exhibited by conventional derailleurs. According to the invention, the actuation ratio is no greater than 1.5:1, preferably less than 1.2:1, regardless of guide wheel position, and is (in the embodiment shown in FIG. 5) substantially uniform through the p-knuckle range of motion. This makes the derailleur of the invention much more suited for use with the simple spool shift actuator referred to herein.

Figure 11:
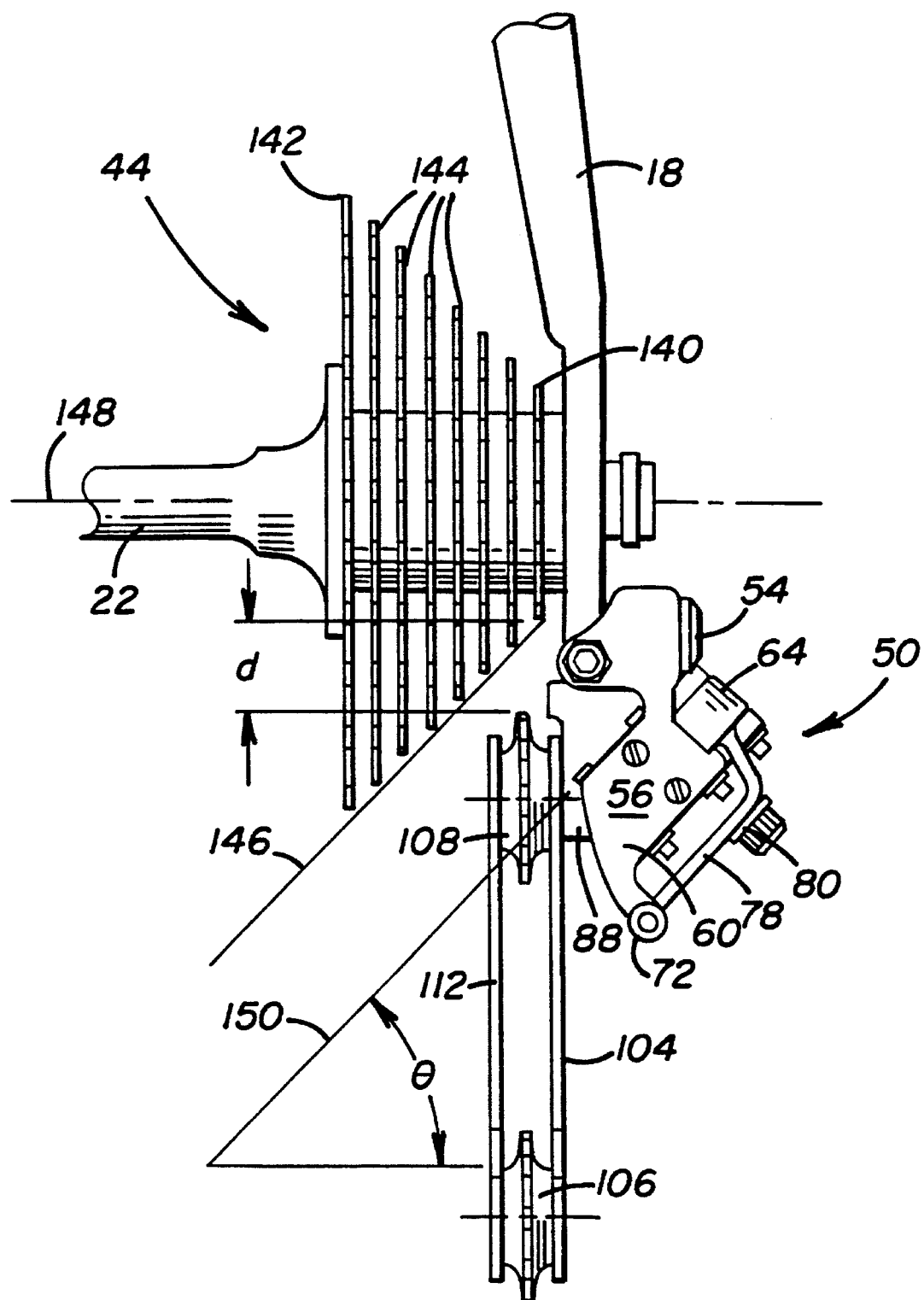
FIG. 11 is a top view detail of a rear hub, freewheel and rear derailleur according to the invention, showing a match of guide wheel movement to freewheel angle.

Referring now to FIG. 11, the freewheel 44 includes a smallest, outboardmost sprocket 140, a largest, inboardmost sprocket 142, and a plurality of sprockets 144 ranged in size and position in between sprockets 140 and 142. A line drawn from the outermost margin of sprocket 140 to the outermost margin of sprocket 142 is indicated at 146. The angle which line 146 makes with the axis 148 of rear hub 22 is termed the freewheel angle, which is the arctangent of the difference in radius between sprockets 140 and 142 directed by the axial spacing between sprockets 140 and 142. A distance "d" between the outermost margin of any sprocket 140, 142, 144 and the outer margin of the teeth of upper guide wheel 108 is termed the freewheel chain gap. It is desirable to keep the chain gap as constant as possible regardless of the sprocket position of the upper guide wheel 108.

The freewheel angle of mountain bikes tends to be on the order of 44° to 50°, much steeper than the 33° to 34° seen in conventional road bikes. Some conventional mountain bike derailleur designs have not taken the steeper freewheel angle into account, such that their chain gap is less than optimally constant. Other conventional derailleur designs employ various methods in addition to the parallelogram slant to control the chain gap. Such methods include providing a sprung articulation at the "B pivot" and offsetting the axis of the upper guide wheel from the axis of the "P pivot". These methods are adversely affected when chain is taken up or paid out as when shifting from one chain ring to another chain ring with a vastly different tooth count. The steep parallelogram angle of the derailleur 50 of the present invention is formed such that the movement of guide wheel 108 will be along a line 150 that is substantially parallel to the line 146. Therefore, the chain gap is substantially constant throughout the entire range of motion of the derailleur 50.

Figure 12:
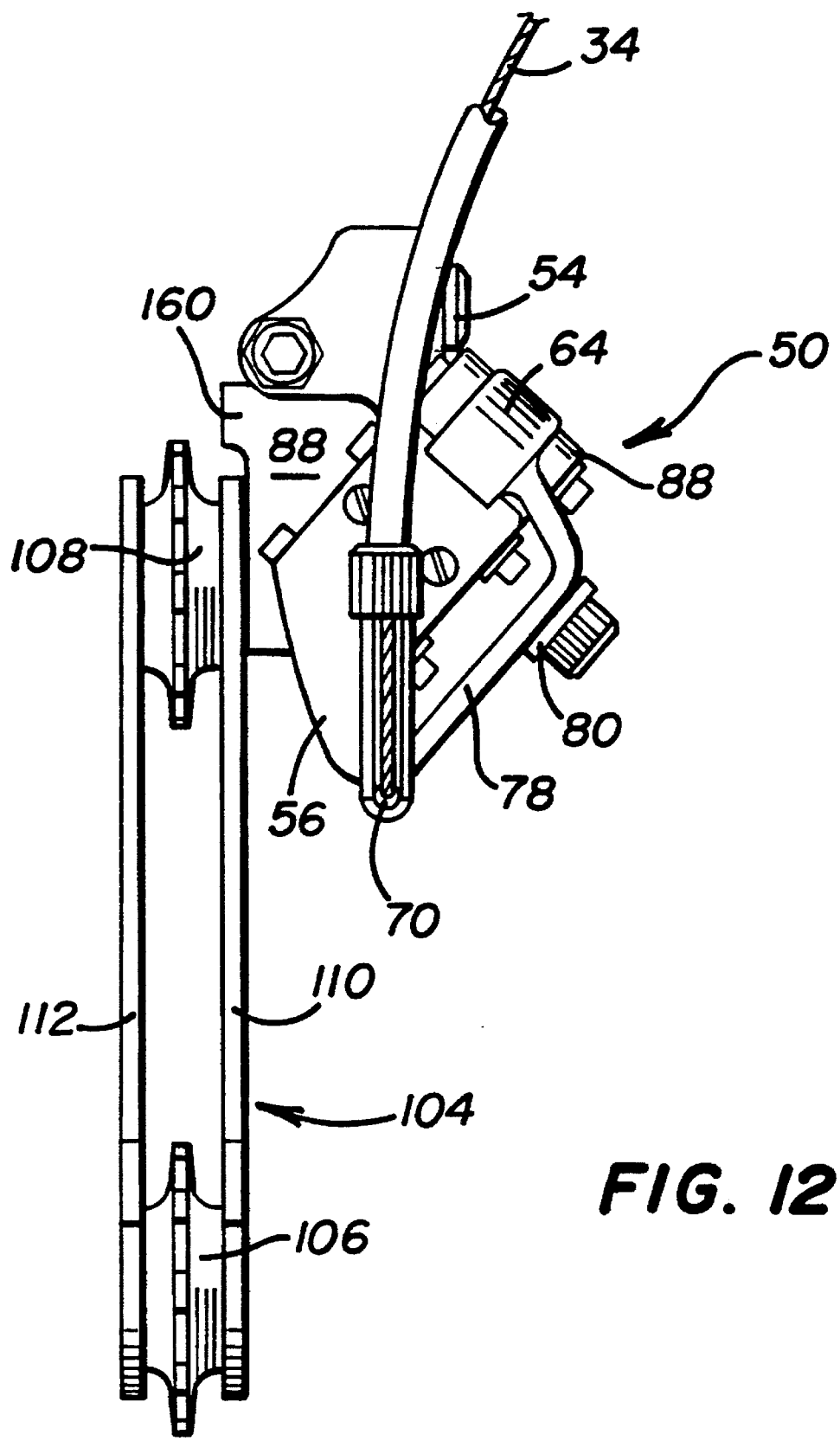
FIG. 12 is a top view detail of the derailleur according to the invention, showing the location of a p-knuckle flange.

FIG. 12 represents a top view of a derailleur 50 according to the invention. The p-knuckle 88 has a flange 160 which is located just forward of, and just outboard of, the point of departure of the chain (not shown) from the upper guide wheel 108. The p-knuckle flange takes the place of flange extensions of the idler cage plates 110 and 112 in the prior art, which significantly improves chain shifting, as will be discussed below.

Figure 13:
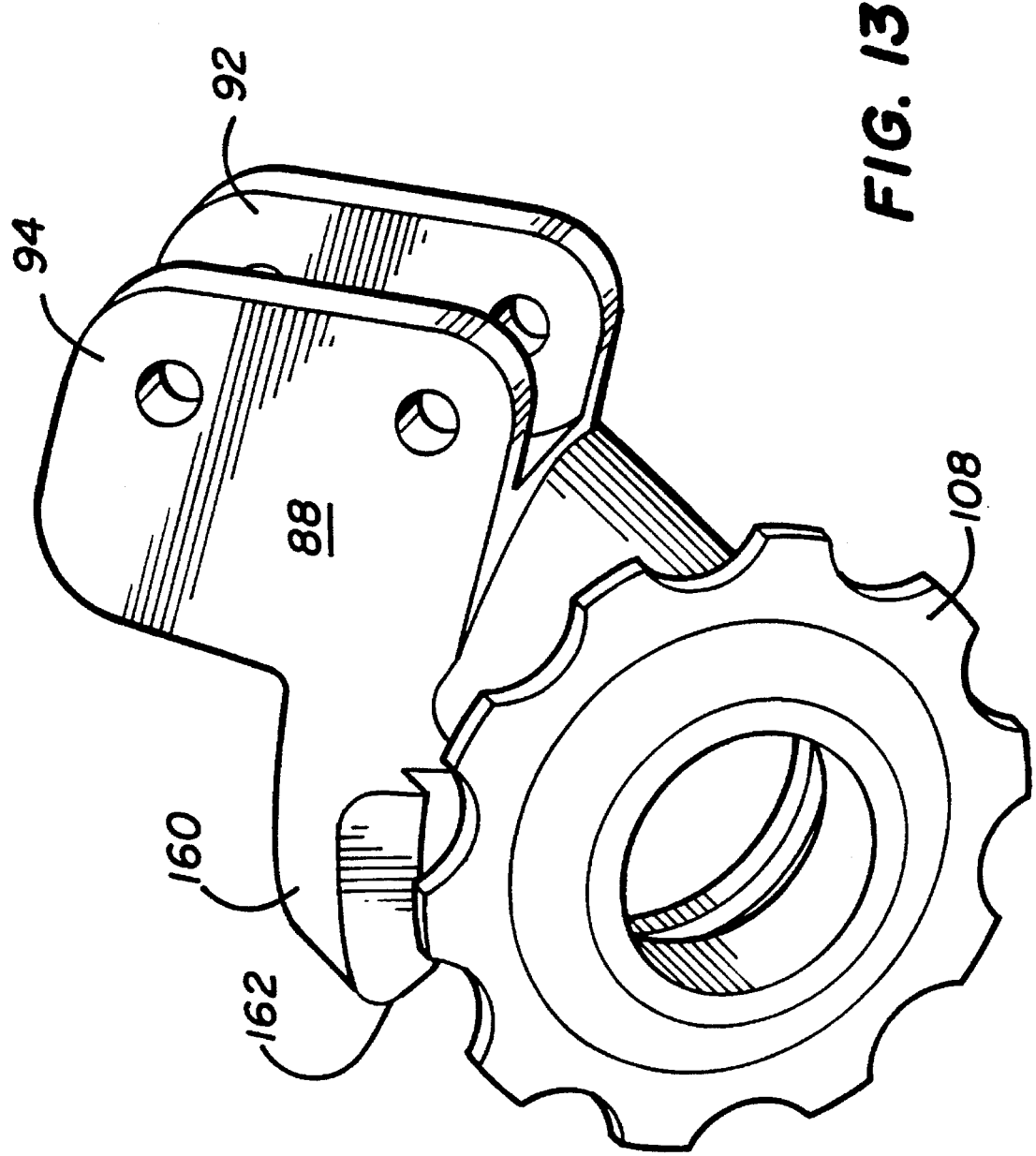
FIG. 13 is an isometric enlarged detail showing the relationship of the p-knuckle flange to the upper guide wheel of the derailleur.
Figure 14:
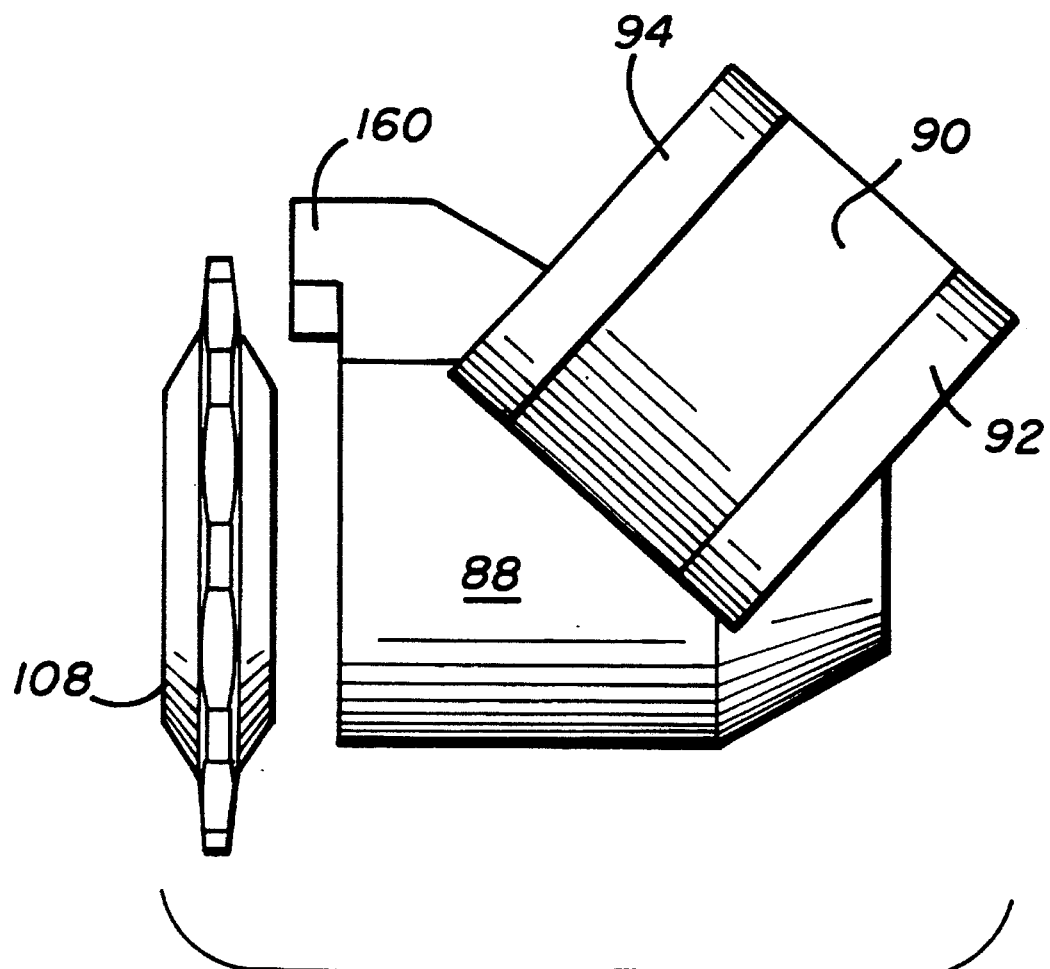
FIG. 14 is a top view of the structure illustrated in FIG. 13.

FIG. 13 is an enlarged isometric detail of the p-knuckle 88 and the upper guide wheel 108 rotatably mounted thereon, showing the relative position of these two components 88, 108. The p-knuckle flange 160 has a forward edge 162 which is just forward of and is just outboard of a point of departure of the drive chain (not shown) from the guide wheel 108, so as to be substantially proximate thereto. The flange 160 is nonrotationally affixed to, and preferably is integrally formed with the rest of p-knuckle 88. FIG. 14 provides another detailed view of p-knuckle 88 and upper guide wheel 108 from another angle. The substitution of a guide flange on the p-knuckle 88 for an idler cage flange obviates a chain binding problem experienced with conventional derailleurs.

Figure 15B:
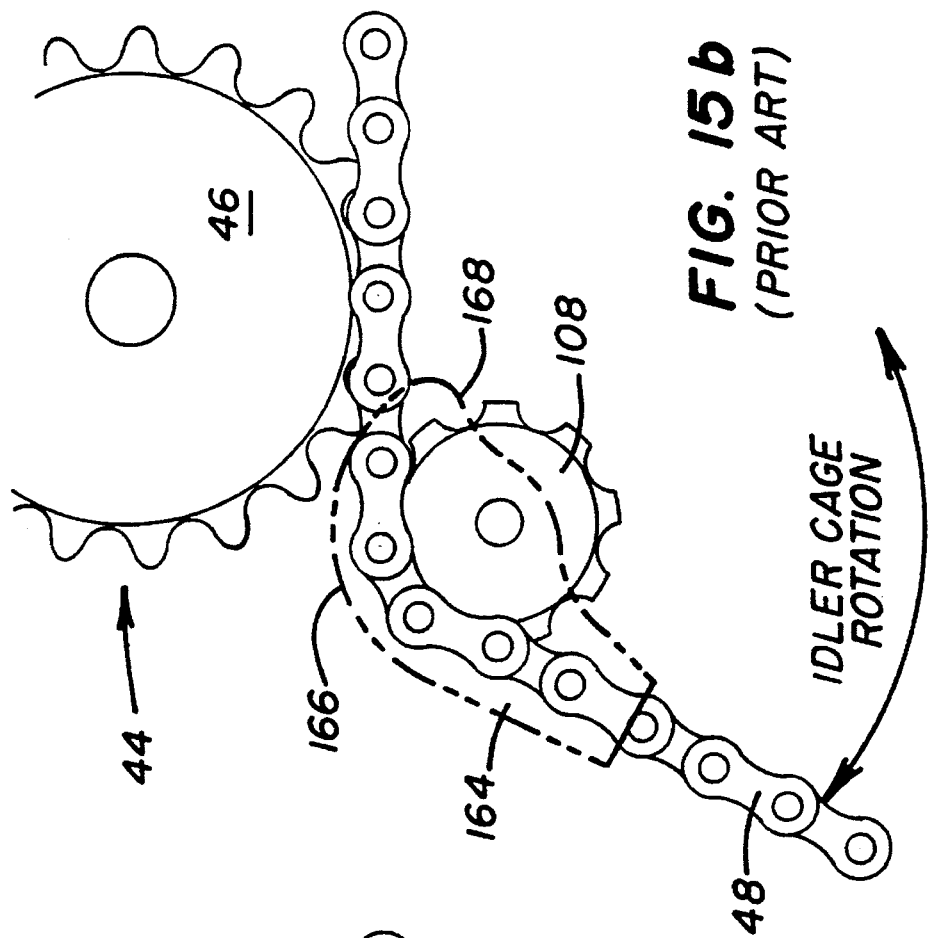
FIGS. 15a and 15b are schematic elevational views showing the position of a prior art derailleur guide wheel cage (shown in dotted line) in relation to the guide wheel, the drive chain and an engaged sprocket in a pair of different angular positions of the idler cage.
Figure 15A:
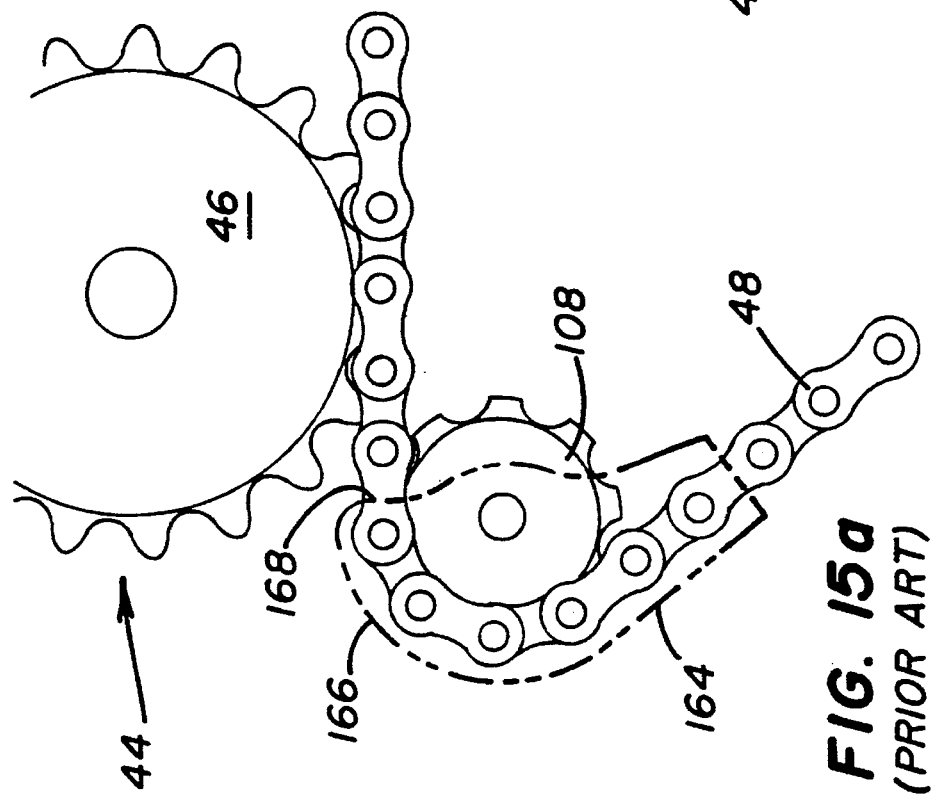

FIGS. 15a and 15b are schematic diagrams of a derailleur according to the prior art, with an inboard idler cage plate 164 being shown in dotted line. The idler cage plate 164 has an upper extension or flange 166 which is used to force the chain 48 from an outboard sprocket to an inboard sprocket according to prior art derailleur shifting function. As different sprockets of the freewheel 44 are engaged, the idler cage will go through a substantial angular displacement around the hub of wheel 108, illustrated by the change in position of chain 48 in FIGS. 15a and 15b. As the idler cage rocks from one position to the other, a forward edge 168 of the upper idler cage plate flange changes position from that shown in FIG. 15a to that shown in FIG. 15b.

Diagrams corresponding to those shown in FIGS. 15a and 15b, but illustrating the operation of the invention, are set forth in FIGS. 16a and 16b. As can be seen, the p-knuckle flange 160 and its forward edge 162 do not change position with respect to the drive chain point of departure, irrespective of the large amounts of idler cage angular displacement which may occur between alignments with different chain-ring positions.

Figure 17C:
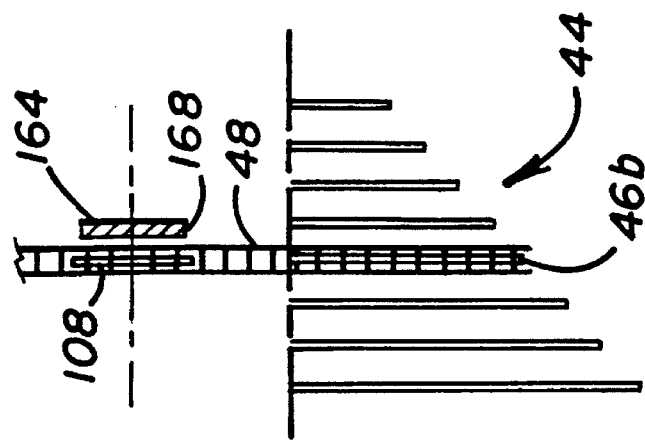
FIGS. 17a, 17b and 17c are schematic diagrams showing the shifting operation of a prior art derailleur from a smaller sprocket to a larger sprocket on a freewheel.
Figure 17B:
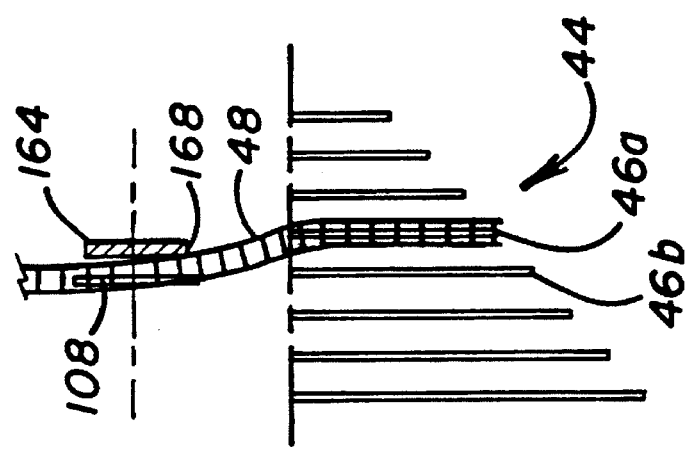
Figure 17A:
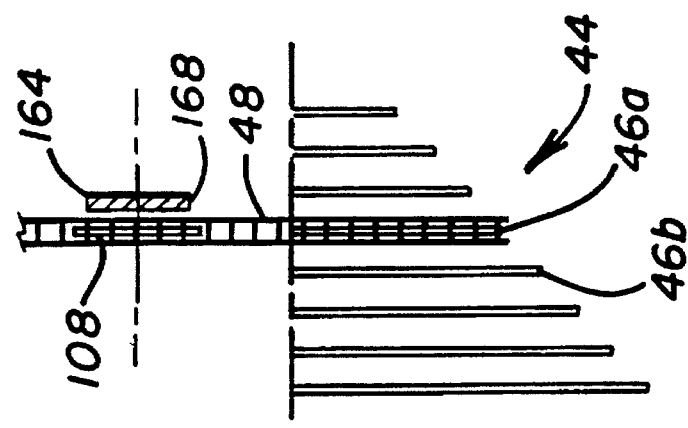

FIGS. 17a–17c are schematic diagrams showing operation of a conventional derailleur. The situation described in FIGS. 17a–17c is most likely to occur when the leading edge 168 of the idler cage flange is in its most forward position, as might happen when one of the smaller chainrings is being used. The situation before the shift is shown in FIG. 16a. The upper guide wheel 108 is aligned with a sprocket 46a. The idler cage guide flange 164 in this condition is not contacted by the chain 48. This situation during an inboard shift is shown in FIG. 17b. The idler cage 164 has been moved from an alignment with a smaller sprocket 46a to an alignment with a larger sprocket 46b. When this is done, and prior to the shift of chain 48, the leading edge 168 will rub against the chain 48, causing friction between these two components. Instead of allowing the lateral flexibility of chain 48 to shift from one of the sprockets 46a to sprocket 46b, the leading edge 168 uses brute force to laterally translate the chain 48 to the bigger sprocket. FIG. 17c illustrates the position of the chain 48, upper guide wheel 108, and cage plate 164 after the shift has taken place. Shifting according to this prior art method causes wear on the cage plate 164, increases the amount of force necessary in order to make an inboard shift FIGS. 18a–18c show derailleur operation according to the present invention. As discussed above, the leading edge 162 of the p-knuckle flange 160 remains in a static position relative to the point of departure of the chain 48 from the upper guide wheel 108, no matter which combination of sprockets and chainrings is presently being used. Since the chain gap between the upper guide wheel 108 and the freewheel 44 is not diminished by the flange 160, the chain 48 has the ability to flex laterally to its fullest extent, as is shown in FIG. 18b. The situation after the shift is shown in FIG. 18c. The leading edge 162 of the p-knuckle flange 160 is provided only to prevent the derailment of chain 48 from the upper guide wheel 108. The resulting derailleur shifting process is amazingly smooth and effortless in comparison to prior art derailleurs. The substitution of the p-knuckle flange 160 for the prior art idler cage plate flange 166 makes the derailleur of the invention more suitable for the multiple-chainring shifting often encountered on mountain bikes.

Figure 19:
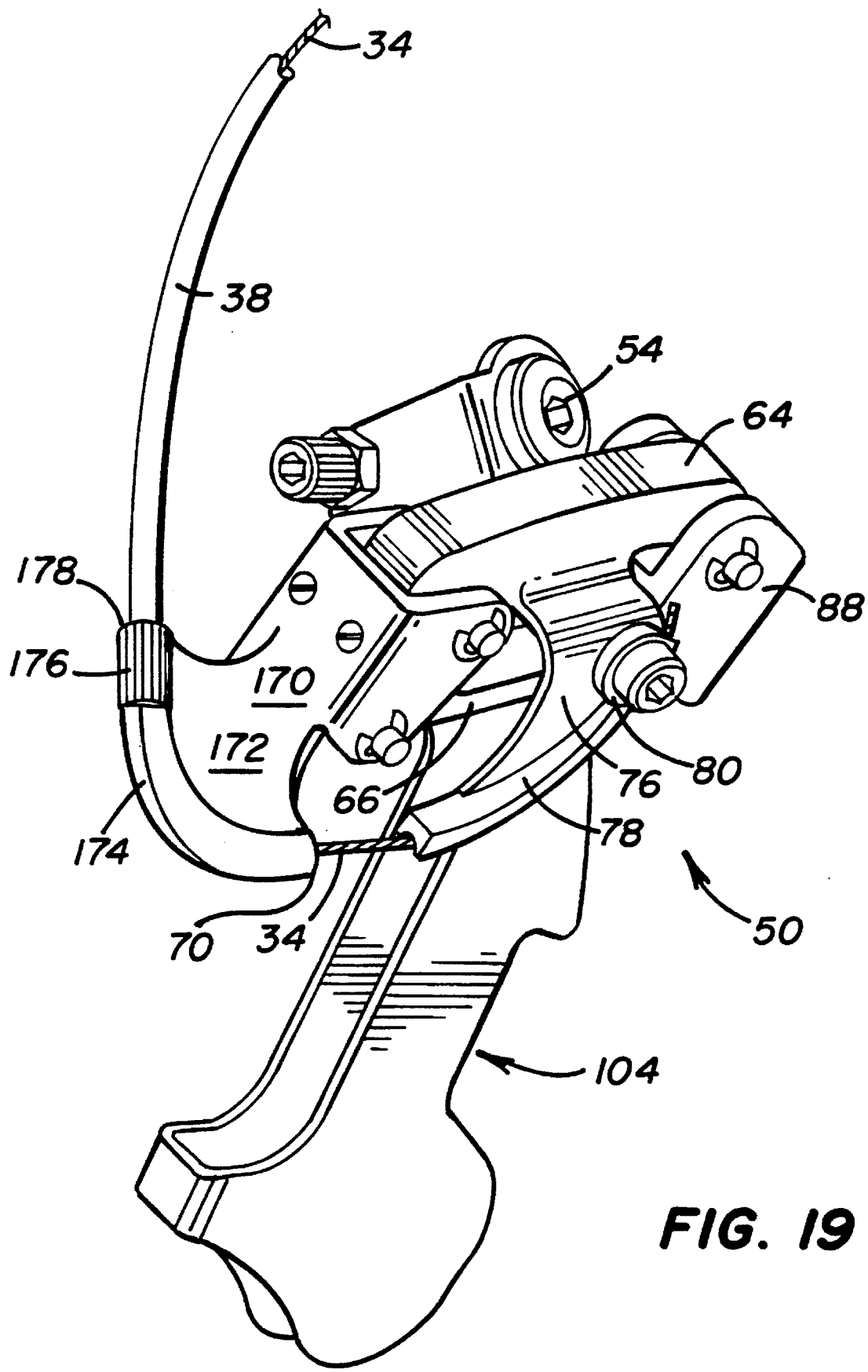
FIG. 19 is an isometric view of a rear derailleur employing a second rigid curved cable-entraining surface according to the invention.

FIG. 19 illustrates another aspect of the invention in which the b-knuckle 56 shown for example in FIGS. 3a, 4 and 5, has been replaced with a b-knuckle 170. The b-knuckle 170 is affixed to the bicycle frame via hanger bolt 54 as before, and is hinged to the sideplates 64 and 66 like b-knuckle 56. An end of cable 34 is affixed to sideplate 64 via support flange 26. Alternatively, the cable end could be affixed to the p-knuckle 88 or to sideplate 66. The b-knuckle 170 differs from b-knuckle 56 in that b-knuckle 170 includes a flange or extension 172 which terminates in a rigid, slippery, grooved or concave surface 174. Surface 174 extends from the cable orifice 70, through a predetermined and substantial arc, and ends in a cable ferrule 176. Orifice 70 can be replaced by an outlet that is not closed, such as a U-shaped channel. An end 178 of the housing 38 of the cable 34 terminates in the ferrule 176. The arcuate guide surface 174 replaces a portion of the housing 38 through this arc in order to resolve a problem which has been experienced with conventional rear derailleur cable housings: the accumulation of water and dirt in low points of the cable housing. This has caused the cable 34 to stick (or seize) inside the housing 38, increasing the force necessary to make a shift. The surface 174 can be made more rigid and can be made slipperier than the interior of the housing 38. It is preferred that the surface 174 be left open such that mud, grime, water and other foreign matter will not accumulate but will slough off.

Figure 19A:
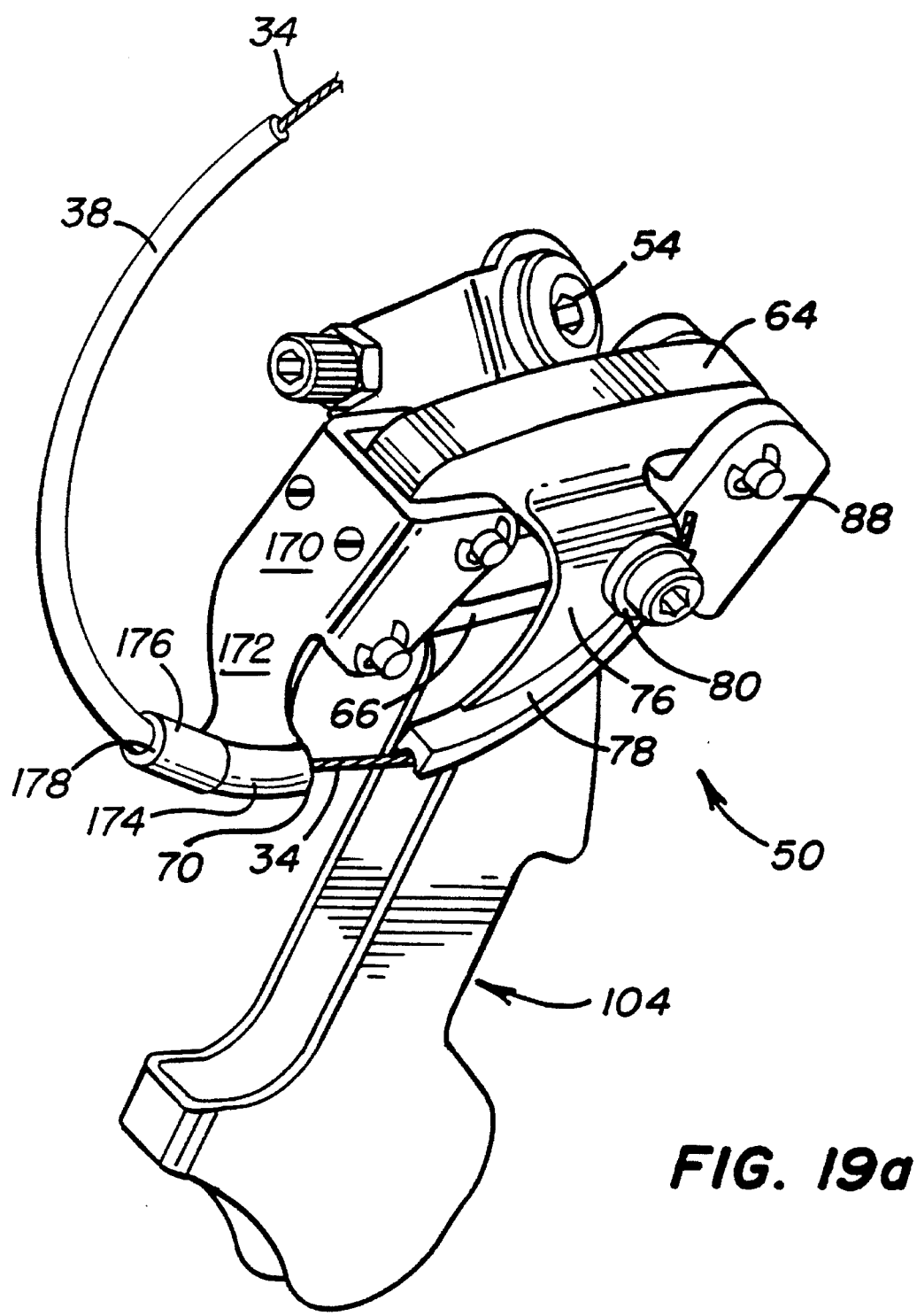
FIG. 19a is an alternative embodiment showing a shortened second rigid curved cable-entraining surface.

Further, since the end 178 of the housing 38 now points generally in a downward direction, any matter accumulated within the housing 38 will have a tendency to fall directly out. While an arc of 90° is shown in FIG. 19 such that the direction of the cable 34 is translated from a rearward, substantially horizontal direction to an upward, substantially vertical direction, arcs which are >90° or <90° can be fabricated. The alternative embodiment shown in FIG. 19a illustrates an arc of only 15°. The grooved surface 174 can be made slippery by the application of a suitable coating such as "TEFLON" or alternatively can be provided with a low friction surface by forming the entire b-knuckle 170 from a machinable, low-friction polymer such as "TEFLON", "NYLON®" or more preferably an acetal resin, such as one sold under the trademark "DELRIN" 500 CL by DuPont.

As stated above, the actuation ratio of the disclosed derailleur is substantially uniform and maintained below 1.5:1 making the derailleur of the invention ideal for use with a hand-rotatable "simple spool" shift actuators. Referring to FIG. 21 there is shown a graphical and numerical representation of shift actuator rotation per derailleur movement for seven shift actuation systems. The values set forth in FIG. 21 are an average across the freewheel or sprocket set.

Figure 20:
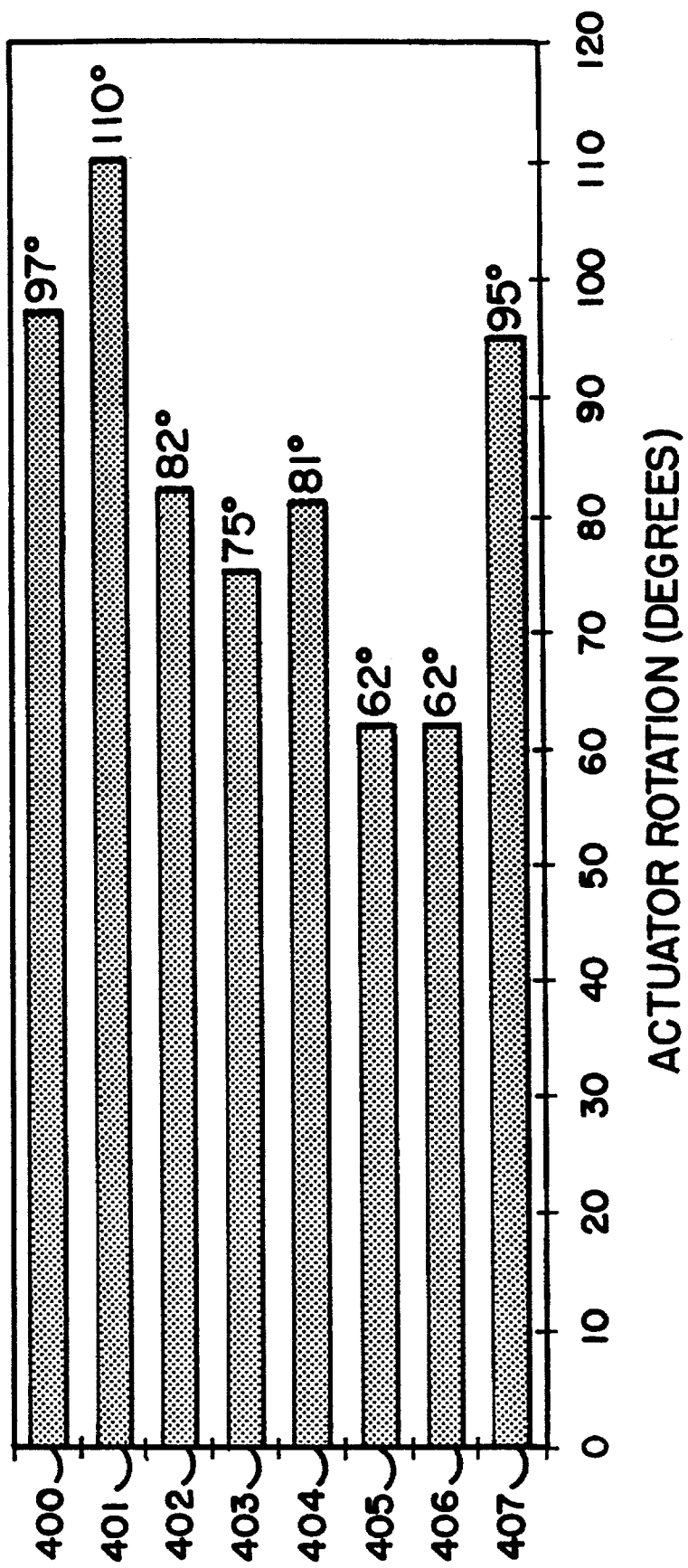
FIG. 20 is a graphical representation of shift actuator rotation versus derailleur movement for various shift actuator systems.

As indicated in FIG. 20 and discussed in detail below, the simple spool shift actuator of the present invention has unique characteristics that are not only optimal with the above discussed derailleur, but beneficial to all other systems.

By way of summary, in the design of an indexing hand-rotatable shifting system there are several parameters that must be brought into a proper relationship for optimal performance of the system. These parameters include: actuator rotation per shift, input torque to shift against the derailleur return spring, detent release torque to shift towards the derailleur return spring, and derailleur return spring biasing force.

In general, for optimal performance the actuator input torque to shift against the derailleur biasing force is minimized, and the biasing force is maximized. There is obviously a trade-off between input torque and biasing force.

To achieve the best compromise between input torque and biasing force, the mechanical advantage of the shift actuator over the derailleur movement must be optimized. To eliminate the variations due to different biasing forces and sprocket spacing, the geometric description "actuator rotation per derailleur movement" is employed to describe the mechanical movement of the actuator and the derailleur.

As illustrated in FIG. 20, actuator rotation is expressed in degrees; derailleur movement—the displacement of the upper guide wheel or cage parallel to the axle or spindle (or perpendicular to the plains of the sprockets or chain rings)—is a constant (1 inch). The actuator rotation per derailleur movement is derived by dividing the derailleur actuation ratio by the actuator cable pull rate, the actuator cable pull rate being the amount of cable pulled per degrees of rotation of the actuator.

Curve 400 represents a conventional parallelogram derailleur and a shovel cam type shift actuator such as that disclosed in U.S. Pat. No. 5,197,927. Generally, the cable pull rate of the shovel cam can be set at any arbitrary value by choosing major and minor spooling diameters. However, the minor diameter must be at least one inch to permit the use of a protective mandrel over the bicycle handlebar. Generally, the cable pull rate is proportional to the difference between the major and minor diameters. Thus, by setting the difference between a major and minor diameters at a value in a range of 0.6–.65 inches, the system has a net actuator rotation per derailleur movement of approximately 97° per inch. Applicants have found that an optimum system results from such a rotation to movement ratio.

Curve 401 represents a jackspool type shift actuator and a conventional derailleur. In the noted design, the primary take-up spool must be large enough in diameter to clear a protective mandrel over the handlebar. However, it has been found that the use of a separate jack shaft with two spools of arbitrary diameters allows the shifter to be designed with any arbitrary cable pull rate. The resulting system was thus designed with a rotation to movement ratio of approximately 110° per inch.

Curve 402 represents a further shift actuator system. In this design no shovel cam or jackspool was employed to control the cable pull rate. Instead, the cable pull rate was reduced to a minimum by not using a protective mandrel on a handlebar and placing the twist grip and take-up spool directly on a handlebar. In this manner the take-up spool diameter was minimized.

The derailleur employed in the above system was a conventional parallelogram design with the actuation ratio reduced, presumably, as much as possible. The resulting system rotation to movement ratio is approximately 82° per inch.

Because of this low movement ratio, which translates to fast shifting but low mechanical advantage of actuator over derailleur, it is necessary to use a spring assist in the actuator to oppose the biasing force of the derailleur. The resulting system is thus very heavy and complicated.

Curve 403 represents a system that is very similar to the system represented by curve 402, having a conventional derailleur with a reduced actuation ratio and a simple spool (twist grip) actuator turning directly on the handlebar to minimize the take-up spool diameter. The resulting system has a rotation to movement ratio of approximately 75° per inch.

Curve 404 represents a system which employs a non-conventional derailleur design embodying a rotating derailleur cam having peaks and valleys which translate cable displacement into derailleur movement. The system does, however, employ a simple spool actuator turning on a protective mandrel. The cable pull rate of the shift actuator is much higher than that represented by curves 402 and 403, but the derailleur cam adjusts the system rotation to movement to approximately 81° per inch. This resulting system is very sluggish due to the complexity in the derailleur design.

Curves 405 and 406 have the greatest apparent similarity to curve 407, which represents the simple spool shift actuator of the invention. All three systems represented by curves 405, 406 and 407 use a similar shift actuator design from the standpoint of cable pull. Each shift actuator employs an actuator take-up spool which turns over a protective mandrel (protective of the handlebar) and exhibits a high cable pull rate. The systems represented by curves 405 and 406 have an overall rotation to movement ratio of approximately 62° per inch.

Curve 407 represents the simple spool shift actuator and derailleur of the invention. As discussed in detail below, the actuator employs a take-up spool which turns over a protective mandrel. As illustrated in FIG. 20, the cable pull rate of the shift actuator is only slightly less than the systems represented by curves 405 and 406. However, the overall system rotation to movement ratio is approximately 95° per inch, a 53% increase in mechanical advantage over the simple spool shift actuator systems represented by curves 405 and 406.

Referring now to FIGS. 21 and 22, the components of a preferred hand-rotatable, simple spool shift actuator 300 are shown. As illustrated in FIG. 21, the actuator 300 has two principal components, a housing 316 secured to the handlebar 14 and a twist grip 318. The housing 316 includes an elongated tube or mandrel 320 which is received in preferably a snug fit on the handlebar 14. The housing 316 is formed with a pocket (not shown) on the right side as viewed in FIG. 22 for receiving a clamp 322 which secures the housing 316 to the handlebar 14. The U-shaped clamp 322 is secured to the handlebar 14 by a conventional bolt 324 which loosely passes through a hole 326 in one leg of the clamp 322 and engages threads in a hole 328 provided in the other leg of the clamp.

Formed as a portion of the housing 316 is a cable guide tube 330, which is provided at its distal end with external threads 332 for mating with internal threads 332a provided on a coupler 334. The coupler 334 secures a cable tube 336 to the cable guide tube 330. Surrounding the mandrel 320, next to a radial extending wall 338 of the housing 316, is a spring retaining portion 340.

Formed in a circumferential surface of the spring retaining portion 340 is an elongated notch 342 which captures a first portion 344 of a formed spring 346, another portion of which cooperates with the twist grip 318 to define selected positions of the twist grip 318. First portion 344 of the spring 346 rests in the notch 342, while a convex bend 348 of an extension of the spring 346 is engageable in a plurality of notches or detents 350 formed on the inner circumferential surface of wall 356 of the twist grip 318. According to the invention, the interaction of the first portion 344 of spring 36 with the notches 350, defines the position of the twist grip 318 with respect to the housing 316 which corresponds to desired engagement positions of the derailleur.

The twist grip 318 is formed with an external grip portion 358 and an adjoining enlarged portion 360 on which may be printed the numerals shown as 1 through 7 in FIG. 21, which when located with respect to an index mark 362 on the housing 310 define a plurality of operating positions of the hadgrip assembly. Extending to the left of the handgrip portion 358, as viewed in FIG. 22, is not only the wall 356, but also a cable engaging portion 364 of twist grip 318. An operating cable 366 is retained behind a radially extending wall portion 368 of portion 364 and a radial extending face 370 of the enlarged portion 360. The operating cable 366 rests upon a spool 372 of substantially uniform radius formed between the wall portion 368 and the radially extending face 370 as shown in cross-section FIG. 22. The radius at which rotation of the twist grip 318 acts on the operating cable 66 is referred to as the "spooling radius". Thus, a slot having a radial height is formed between the wall portion 368 and radially extending face 370.

As illustrated in FIG. 22, an enlarged retainer 376 is provided on the end of the cable 366 to prevent it from being pulled through the slot. With the cable 366 secured in the slot formed in the grip portion 318, and spring 344 placed in elongated notch 342, the grip is assembled to the housing 316 in the direction of the arrow such that the wall 356 is received in the space 380 between the outer wall 382 of the housing 316 and the spring retaining portion 340. To complete the assembly, a cover 384 is placed over the open portion of the cable guide tube 330 and secured in place by a screw 386 which is threadedly engaged in a hole 388 formed in a projection 390 extending from the housing 316.

Figure 23:
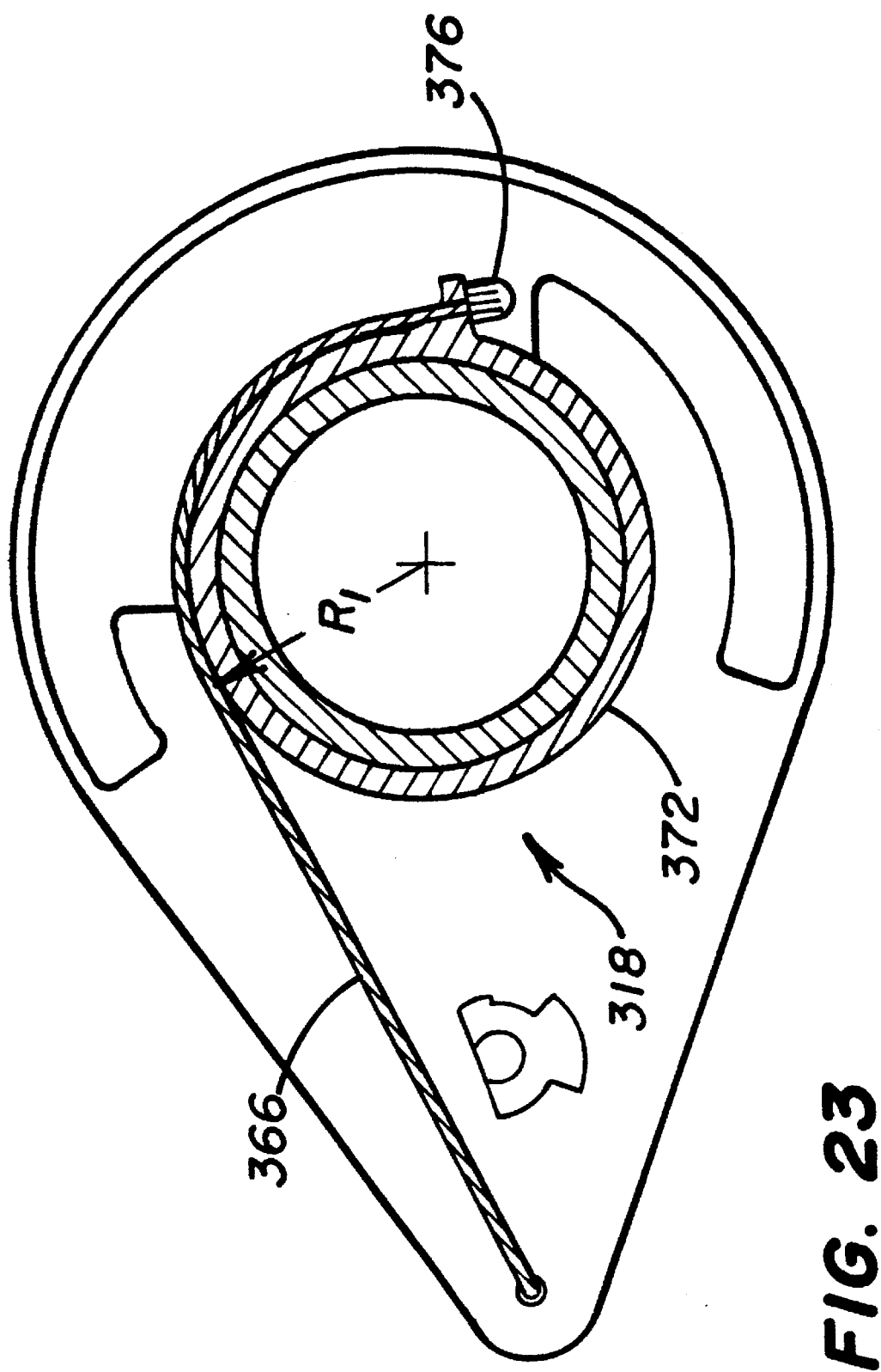
FIG. 23 is a view taken substantially along line 23—23 of FIG. 21.

Referring now to FIG. 23, the operation of the simple spool 372 of this invention will be further described. With the cable 366 fully extended from the housing 316, the position of twist grip 318, and more particularly of the spool 372, with respect to the housing 316 is shown. As illustrated in FIG. 23, as the cable 366 is rotated about the spool 372, it is maintained at a radius $R_1$ from the center of the handlebar 14. The radius $R_1$ substantially corresponds to the outside diameter of the spool 372.

In a preferred embodiment of the invention, the radius $R_1$ (i.e. spooling radius) is maintained in the range of approximately 0.3 to 1.0 in., preferably 0.5 to 0.6 in. The cable pull rate of the simple spool actuator, would thus be equal to 2 times π (amount of cable pulled per degree rotation) times $R_1$ divided by 360°.

In summary, a derailleur and actuating system has been shown and described that is optimally suited for use in mountain cycling. The spooling cable-entraining surface of the derailleur ensures a more constant actuation ratio, lower friction, reduced shifting force and longer control cable life. A p-knuckle flange has been provided which prevents the derailment of the drive chain from the upper guide wheel, but nonetheless does not occlude the lateral flexing of the drive chain while making a shift from one sprocket to another selected sprocket in the freewheel. The angle of movement of the derailleur parallelogram has been selected to match the angle of the freewheel block so as to keep the chain gap relatively constant. A further arcuate surface has been provided for the control cable in replacement of a corresponding section of cable housing to prevent the accumulation of foreign matter.

The hand-rotatable shift actuator is designed and adapted to achieve optimum performance and efficiency of the derailleur and, hence, shifting system. The actuator exhibits a high cable pull rate and employs a cable spool mandrel to protect the handlebar and enhance the integrity of the system.

While preferred embodiments and their technical advantages have been described in the above detailed description and illustrated in the drawings, the present invention is not limited thereto but only by the scope and spirit of the appended claims.

What is claimed is:

1. A bicycle gear shifting system, comprising:
   a derailleur having a p-knuckle, a b-knuckle and an actuation regulator, said b-knuckle being affixed to a bicycle frame, said b-knuckle being operatively connected to said p-knuckle,
   said actuation regulator being operatively connected to said p-knuckle to control the actuation ratio of the derailleur, said actuation regulator maintaining the actuation ratio of the derailleur at no greater than 1.5:1 over the range of motion of said p-knuckle;
   a shift actuator; and
   a control cable operatively connected to said derailleur and said shift actuator.

2. The bicycle gear shifting system of claim 1, wherein said actuator includes a rotatable member mounted on the bicycle handlebar generally coaxially of the handlebar.

3. The bicycle gear shifting system of claim 2, wherein said rotatable member includes a simple spool member, said control cable being operatively connected to said simple spool member.

4. The bicycle gear shifting system of claim 3, wherein said shift actuator and said derailleur have an actuator rotation to derailleur movement greater than 65° per inch.

5. The bicycle gear shifting system of claim 3, wherein said shift actuator and said derailleur have an actuator rotation to derailleur movement in the range of approximately 92°–97° per inch.

6. A bicycle gear shifting system, comprising:
   a derailleur having a p-knuckle, a b-knuckle and an actuation regulator, said b-knuckle being affixed to a bicycle frame, said b-knuckle being operatively connected to said p-knuckle,
   said actuation regulator being operatively connected to said p-knuckle to control the actuation ratio of the derailleur, said actuation regulator maintaining the actuation ratio of the derailleur at a mean actuation ratio of 1.4–0.5:1;
   a shift actuator; and
   a control cable operatively connected to said derailleur and said shift actuator.

7. The bicycle gear shifting system of claim 6, wherein said actuator includes a rotatable member mounted on the bicycle handlebar generally coaxially of the handlebar.

8. The bicycle gear shifting system of claim 7, wherein said rotatable member includes a simple spool member, said control cable being operatively connected to said simple spool member.

9. The bicycle gear shifting system of claim 8, wherein said shift actuator and said derailleur have an actuator rotation to derailleur movement greater than 65° per inch.

10. The bicycle gear shifting system of claim 8, wherein said shift actuator and said derailleur have an actuator rotation to derailleur movement in the range of approximately 92°–97° per inch.

11. A bicycle gear shifting system, comprising:
    a derailleur having a p-knuckle, a b-knuckle and an actuation regulator, said b-knuckle being affixed to a bicycle frame, said b-knuckle being operatively connected to said p-knuckle,
    said actuation regulator being operatively connected to said p-knuckle to control the actuation ratio of the derailleur, said actuation regulator maintaining a substantially uniform actuation ratio over the range of motion of said p-knuckle;
    a shift actuator; and
    a control cable operatively connected to said derailleur and said shift actuator.

12. The bicycle gear shifting system of claim 11, wherein said actuator includes a rotatable member mounted on the bicycle handlebar generally coaxially of the handlebar.

13. The bicycle gear shifting system of claim 12, wherein said rotatable member includes a simple spool member, said control. cable being operatively connected to said simple spool member.

14. The bicycle gear shifting system of claim 13, wherein said shift actuator and said derailleur have an actuator rotation to derailleur movement greater than 65° per inch.

15. The bicycle gear shifting system of claim 13, wherein said shift actuator and said derailleur have an actuator rotation to derailleur movement in the range of approximately 92°–97° per inch.

16. The system of claim 11, wherein the actuation force of said derailleur is substantially equal to the bias force of said derailleur.

17. The system of claim 11, wherein said actuation regulator maintains the actuation ratio of the derailleur at no greater than 1.5:1.

18. The system of claim 11, wherein said actuation regulator maintains a mean actuation ratio in the range of 1.4–0.5:1.

19. The system of claim 11, wherein said p-knuckle includes at least one guide wheel rotatably affixed thereto.

20. The system of claim 11, wherein said control cable includes a housing, said housing having a first and second end.

21. The system of claim 11, wherein said b-knuckle is affixed to the bicycle frame in fixed relation to said first housing end.

22. The system of claim 11, wherein the derailleur includes
    at least one sideplate hingedly connected to said b-knuckle and said p-knuckle,
    said sideplate including an entrainment surface extending outwardly toward said first cable end, a length of said control cable proximate said first cable end conforming to said entrainment surface such that said actuation ratio is a function of the effective radius of said entrainment surface, and means for connecting said first cable end to said sideplate.

23. The system of claim 22, wherein said entrainment surface includes a groove for receiving said control cable.

24. The system of claim 22, wherein said entrainment surface is arcuate.

25. The system of claim 24, wherein the effective radius of said entrainment surface changes as a function of a distance from said first cable end.

26. The system of claim 25, wherein said effective radius decreases as the distance from said first cable end increases.

27. The system of claim 22, wherein said actuation ratio is substantially equal to $$\frac{l}{R} \cos\omega\cos\theta$$

wherein l is a length of said sideplate between the points of attachment to said p-knuckle and said b-knuckle, R is said effective radius, $\omega$ is an angle of said sideplate with respect to a plane containing a freewheel sprocket, and $\theta$ is an angle of said sideplate with respect to an axis of the freewheel.

28. The system of claim 22, wherein said b-knuckle has mounted thereon an orifice for receiving said control cable, said orifice being disposed proximate said entrainment surface.

29. The system of claim 22, further comprising a second sideplate hinged between said p-knuckle and said b-knuckle.

30. The system of claim 22, wherein said sideplate is an outboard one of a pair of sideplates hinging said b-knuckle to said p-knuckle.

31. A method for shifting gears in a bicycle gear shifting system having a shift actuator, a derailleur including a p-knuckle and a b-knuckle being operatively connected to said p-knuckle, and a control cable operatively connected to said derailleur and said shift actuator, said method comprising:

providing said derailleur with an actuation regulator, said actuation regulator being operatively connected to said p-knuckle to control the actuation ratio of the derailleur, said actuation regulator maintaining a substantially uniform actuation ratio over the range of motion of said p-knuckle.

32. A method for shifting gears in a bicycle gear shifting system having a shift actuator, a derailleur including a p-knuckle and a b-knuckle operatively connected to said p-knuckle, and a control cable operatively connected to said derailleur and said shift actuator, said method comprising:

providing said derailleur with an actuation regulator, said actuation regulator being operatively connected to said p-knuckle to control the actuation ratio of the derailleur, said actuation regulator maintaining the actuation ratio of the derailleur at no greater than 1.5:1 over the range of motion of said p-knuckle.

33. A method for shifting gears in a bicycle gear shifting system having a shift actuator, a derailleur including a p-knuckle and a b-knuckle operatively connected to said p-knuckle, and a control cable operatively connected to said derailleur and said shift actuator, said method comprising:

providing said derailleur with an actuation regulator, said actuation regulator being operatively connected to said p-knuckle to control the actuation ratio of the derailleur, said actuation regulator maintaining the actuation ratio of the derailleur at a mean actuation ratio of 1.4–0.5:1 over the range of motion of said p-knuckle.

* * * * *